(12) United States Patent
Lucas et al.

(10) Patent No.: US 10,012,967 B2
(45) Date of Patent: Jul. 3, 2018

(54) COORDINATING MODIFICATIONS BY MULTIPLE USERS TO A SHARED AUTOMATED ENVIRONMENT

(71) Applicant: Apple Inc., Cupertino, CA (US)

(72) Inventors: Matthew C. Lucas, San Jose, CA (US); Anush G. Nadathur, San Jose, CA (US); Nathan E. Carroll, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 159 days.

(21) Appl. No.: 15/274,424

(22) Filed: Sep. 23, 2016

(65) Prior Publication Data

US 2017/0357226 A1    Dec. 14, 2017

Related U.S. Application Data

(60) Provisional application No. 62/348,998, filed on Jun. 12, 2016.

(51) Int. Cl.
*H04L 12/28* (2006.01)
*G05B 15/02* (2006.01)

(52) U.S. Cl.
CPC .......... *G05B 15/02* (2013.01); *H04L 12/2816* (2013.01)

(58) Field of Classification Search
CPC . G05B 15/02; H04L 12/2816; H04L 12/2803; H04L 12/2805; H04L 12/2807; H04L 12/2809; H04L 12/281; H04L 12/2812; H04L 12/2814; H04L 12/2818; H04L 12/282; H04L 12/2821; H04L 12/2825; H04L 12/2827; H04L 12/2829; H04Q 9/00
See application file for complete search history.

(56) References Cited

U.S. PATENT DOCUMENTS

| 2016/0086391 | A1* | 3/2016 | Ricci ...................... G07C 5/008 701/29.3 |
| 2016/0102878 | A1* | 4/2016 | Smith ...................... F24F 11/30 700/276 |
| 2017/0033944 | A1* | 2/2017 | Nadathur ............ H04L 12/2816 |
| 2017/0212487 | A1* | 7/2017 | Gupta .................. G05B 19/042 |

* cited by examiner

*Primary Examiner* — Sean Shechtman
*Assistant Examiner* — Marzia T Monty
(74) *Attorney, Agent, or Firm* — Kilpatrick Townsend & Stockton LLP

(57) ABSTRACT

Modifications made by multiple controller devices to an environment model describing a shared automated environment can be coordinated. One of the controller devices can be designated as a coordinator, and any controller device other than the coordinator can send an update request to the coordinator. The coordinator can determine whether to accept or reject the requested modification and can report its determination to the requesting controller device. If the coordinator accepts the request, the coordinator can instigate operations to update the environment model across all controller devices of all users. If the coordinator rejects the request, the environment model is not updated. The controller device that made the request can update its local copy of the environment model and roll back the update if the request is rejected.

16 Claims, 12 Drawing Sheets

| USER | USER ID | CONTROLLER DEVICES | PERMISSIONS |
|---|---|---|---|
| Dad | dsmith@cloud.com | Set-top box | Owner |
| | | Laptop | |
| | | Phone | |
| | | Tablet | |
| Mom | msmith@cloud.com | Tablet | Admin |
| | | Phone | |
| Jill | jill123@cloud.com | Laptop | Basic |
| | | Phone | |
| Jack | jack7@cloud.com | Phone | Basic |
| Sitter | bjones@email.com | Phone | Guest |

*FIG. 3*

COORDINATING MODIFICATIONS BY MULTIPLE USERS TO A SHARED AUTOMATED ENVIRONMENT

CROSS-REFERENCES TO RELATED APPLICATIONS

This application claims the benefit of U.S. Provisional Application No. 62/348,998, filed Jun. 12, 2016, the disclosure of which is incorporated herein by reference.

This disclosure is related to the following U.S. patent applications: application Ser. No. 14/614,914, filed Feb. 5, 2015; application Ser. No. 14/725,891, filed May 29, 2015; and application Ser. No. 14/725,912, filed May 29, 2015. The disclosures of these applications are incorporated by reference herein in their entirety.

BACKGROUND

This disclosure relates generally to a shared automated environment in which accessories can be controlled by controller devices belonging to multiple users and in particular to techniques for coordinating modifications by multiple users to an environment model describing the shared automated environment.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable "accessory" devices, such as thermostats, lighting devices, household appliances, etc. Users want to control these devices easily and conveniently using mobile devices and the like and to automate their operation.

SUMMARY

An automated environment can be provided by enabling one or more accessory devices in a physical environment (e.g., a home) to communicate wirelessly with "controller" devices (which can include, e.g., mobile phones, tablet computers, laptop or desktop computers, wearable devices, set-top boxes, and any other user-operable device that has wireless communication capability) using a uniform accessory protocol. To facilitate coordinated operation of the accessories, an environment model (also referred to herein as "home data") can be defined. The environment model can include data structures identifying the various controllable accessories and defining various groupings of accessories (e.g., by room, zone, and/or supported functionality) and actions to be performed on accessories (e.g., triggered action sets that can be automatically executed under specified conditions, thereby allowing automated operation of accessories). The environment model can also include data structures identifying the authorized users of the automated environment (each of whom may have one or more controller devices) and granting different levels of permission to different users. For instance, some users may be permitted to interact with accessories but not to modify the environment model (e.g., adding or removing accessories, defining groupings of accessories, adding or removing users, etc.), while other users are permitted to modify the environment model (or aspects thereof) as well as interacting with accessories. The environment model can be shared among the authorized users, e.g., in the form of one or more data bundles that can be distributed to the users' controller devices using various combinations of cloud-based data synchronization and device-to-device communication channels. Thus, each controller device can have a local copy of the environment model, which it can use to generate user interfaces allowing its user to interact with the environment represented by the environment model (e.g., by controlling accessories in the environment) and/or edit the environment model (to the extent that the user has permission to edit).

Where the environment model is shared among multiple users or multiple controller devices that each have a local copy, and where more than one of the users (or controller devices) has permission to modify the environment model, challenges may arise in keeping the various copies synchronized with each other, so that all users have a consistent and current model of the environment.

Certain embodiments of the present invention relate to coordinating modifications by multiple users (or multiple controller devices) to an environment model describing the shared automated environment. In some embodiments, one of the controller devices can be designated as a coordinator, and the role of the coordinator can include coordinating updates to the environment model. Any controller device other than the coordinator that has a modification to be made can send an update request to the coordinator. The coordinator can determine whether to accept or reject the requested modification and can report its determination to the requesting controller device. If the coordinator accepts the request, the coordinator can instigate operations to update the environment model across all controller devices of all users. If the coordinator rejects the request, the environment model is not updated.

In some embodiments, the controller device that requests the modification can immediately update its local copy of the environment model, but do so in a mode that prevents the update from propagating to any other controller device. This allows the controller device to present the expected result of the modification to its user without requiring the user to wait for a response from the coordinator. If the coordinator rejects the request, the controller device can "roll back" its local copy of the environment model to match the environment model maintained by the coordinator. In this manner, consistency of the shared environment model can be preserved while still allowing multiple users (or multiple controller devices) to modify the model.

The following detailed description together with the accompanying drawings will provide a better understanding of the nature and advantages of the present invention.

BRIEF DESCRIPTION OF THE DRAWINGS

FIG. 3 shows a table that provides an access list for an environment model according to an embodiment of the present invention.

DETAILED DESCRIPTION

Example Environment

Figure 1:
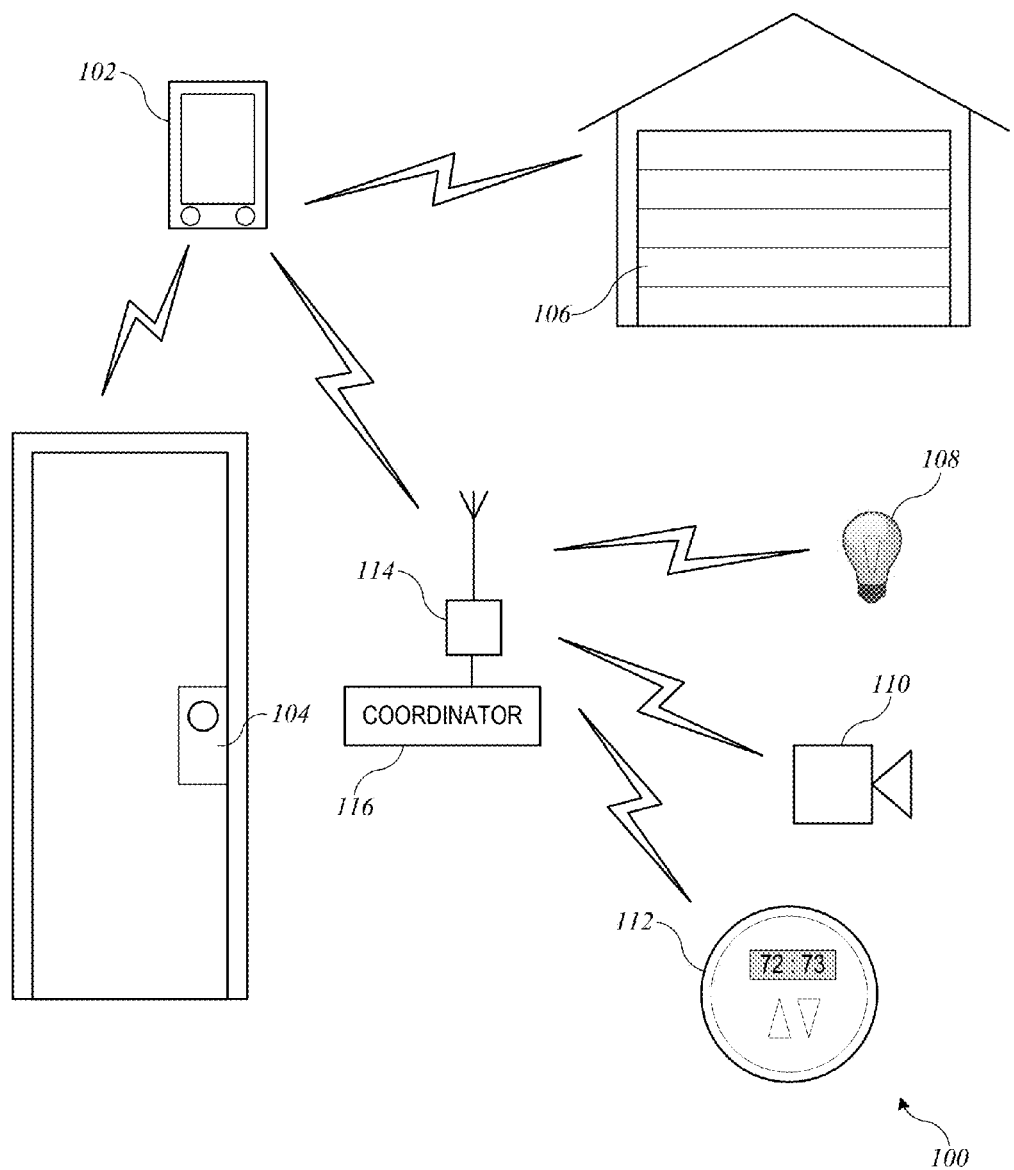
FIG. 1 shows a home environment according to an embodiment of the present invention.

FIG. 1 shows a home environment 100 according to an embodiment of the present invention. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in above-referenced U.S. application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or proxy as described below.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate via an intermediary. For instance, controller 102 is shown communicating via a wireless network access point 114 with accessories 108, 110, 112 that are on a wireless network provided by access point 114. As noted above, in some embodiments, controller 102 can include a base station, and base station functionality can be integrated into access point 114 or into one of the accessories that is to be controlled (e.g., thermostat 112). Another type of intermediary can be coordinator 116, which, in addition to operating as a controller, can relay messages between other controllers and accessories. In some embodiments, coordinator 116 can also implement various control logic to automate or optimize interactions with accessories; examples are described below.

Various communication transports and combinations of transports can be used, and different transports can be used with different devices. For example, some wireless transports such as the Bluetooth® Classic or Bluetooth® Smart communication protocol and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that routes communications between different devices on the network. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. As another example, coordinator 116 can be connected to access point 114 by a wired connection as shown (this connection can be wireless if desired), and controller 102 can communicate with accessories such as light bulb 108 by sending messages to coordinator 116 via access point 114; coordinator 116 can communicate with light bulb 108, either via access point 114 or via another channel such as a Bluetooth LE channel. Other combinations of wired and wireless communication are also possible.

Further, while one controller 102 is shown, a home environment can have multiple controller devices. For example, each person who lives in the home may have his or her own portable device (or devices) that can act as a controller for some or all of accessories 104-112. Different controller devices can be configured to communicate with different subsets of the accessories; for example, a child's controller might be blocked from modifying settings on thermostat 112, while a parent's controller device is permitted to modify the settings. Such privileges and permissions can be configured and controlled, for example, using techniques described below, and in above-referenced U.S. application Ser. No. 14/725,891.

In some embodiments, a uniform accessory protocol can facilitate communication by a controller 102 with one or more accessories 104-112. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. In some embodiments, message formats may be transport-dependent while conforming to the same accessory model. Examples of an accessory model based on services and characteristics are described in above-referenced U.S. application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages. The format can be the same across accessories. Examples of message formats are described in above-referenced U.S. application Ser. No. 14/614,914.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. application Ser. No. 14/614,914.

In some embodiments, communication with a given accessory can be limited to authorized controllers. The protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other, so that an established pairing can be persistent. In some embodiments, the long-term public key of controller 102 can be associated with a specific user of controller 102 rather than with the controller device itself, and the user's long-term public key can be shared across multiple controller devices belonging to the same user, thereby allowing the user to control an accessory using multiple different controller devices without having to establish a pairing of the accessory with each controller device. In other embodiments, the long-term public key of controller 102 can be specific to each controller device.

After a pairing is established, controller 102 is considered authorized, and thereafter, controller 102 and accessory 104 can go in and out of communication as desired without losing the established pairing. When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. application Ser. No. 14/614,914.

In some embodiments, the uniform accessory protocol can assign controllers (or their users) various privileges (or access rights) in regard to the accessories. For example, a "protocol administrator" (or "protocol admin") privilege may be a highest level of privilege, and a controller with protocol admin privilege may establish pairings with accessories and control any controllable characteristic of the accessory state. In some embodiments, the protocol admin privilege may automatically be granted to the first controller (or user) to perform pair setup with a particular accessory, and after the first controller performs pair setup, the accessory can decline to perform pair setup with any other controllers; instead, the controller (or user) with protocol admin privilege can grant access to other controllers (or other users) by performing pair add. In some embodiments, the protocol admin can specify privileges for each added controller or user (including granting protocol admin privilege to the added controller or user).

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. Any type of accessory device can be controlled, including but not limited to door locks, door openers, lighting fixtures or lighting systems, switches, power outlets, cameras, environmental control systems (e.g., thermostats and HVAC systems), kitchen appliances (e.g., refrigerator, microwave, stove, dishwasher), other household appliances (e.g., clothes washer, clothes dryer, vacuum cleaner), entertainment systems (e.g., TV, stereo system), windows, window shades, security systems (e.g., alarms), sensor systems, and so on. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive notifications of updates to) the service and/or its characteristics. Accordingly, protocols and communication processes used in embodiments of the invention can be uniformly applied in any context with one or more controllers and one or more accessories, regardless of accessory function or controller form factor or specific interfaces.

Figure 2:
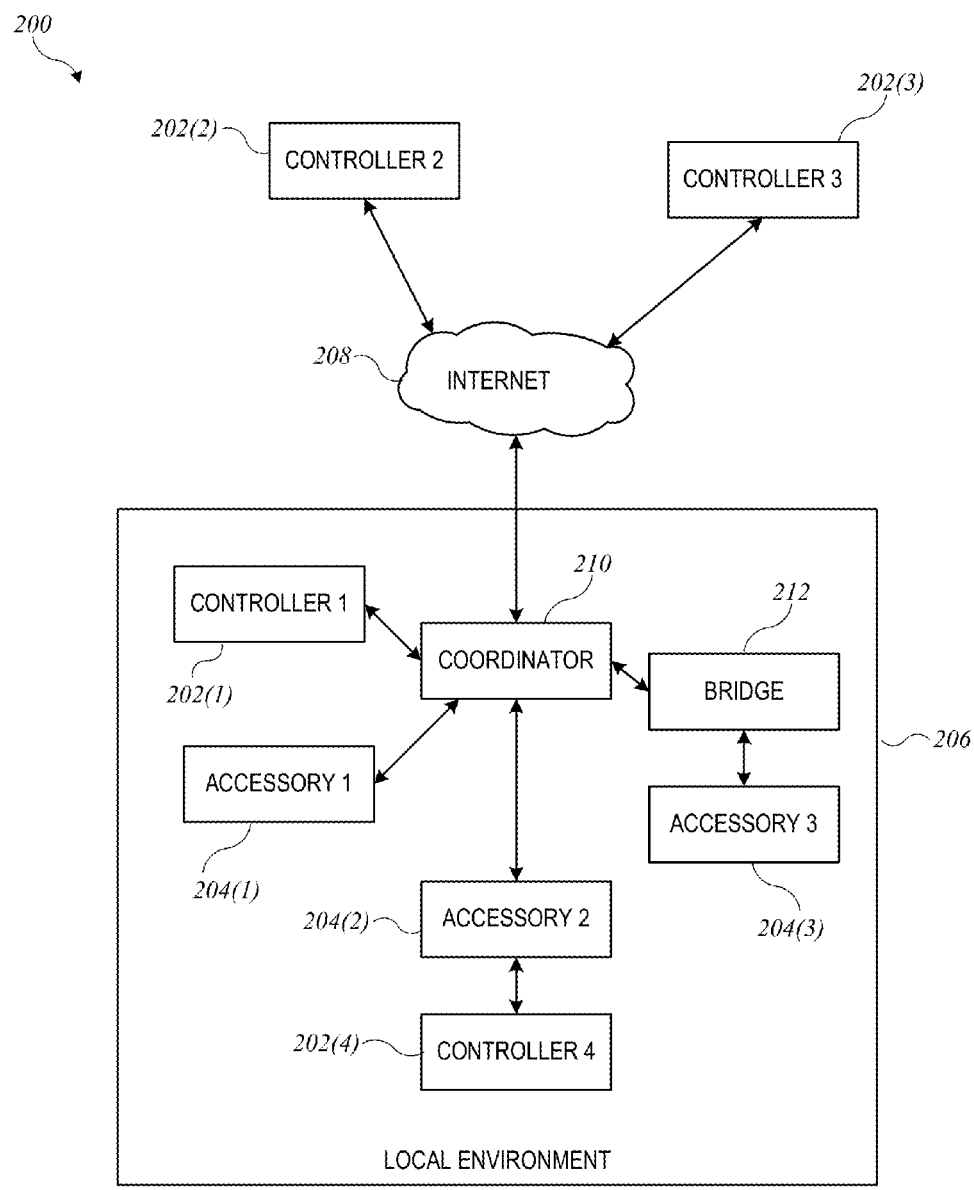
FIG. 2 shows a network configuration according to an embodiment of the present invention.

FIG. 2 shows a network configuration 200 according to an embodiment of the present invention. Configuration 200 allows controllers 202 to communicate with accessories 204 located in local environment 206 (e.g., a home environment) a via a coordinator 210. Each controller 202 can be an electronic device owned and/or operated by a user who frequents environment 206 (e.g., a resident of the home or a regular visitor to the home). Controllers 202 can each be similar to controller 102 of FIG. 1, and accessories 204 can be similar to various accessories shown in FIG. 1.

Accessories 204 can each communicate with a coordinator device (or "coordinator") 210 that can be located with local environment 206. As used herein, a "coordinator" can be an electronic device that is capable of operating as a controller of accessories 204 as well as relaying messages from other controllers (e.g., controllers 202) to accessories 204. In some embodiments, coordinator 210 can be an "intelligent" device that can coordinate operations among multiple controllers and/or accessories and is not limited to passively relaying messages. Coordinator 210 can include any device that is capable of presenting itself as a controller to accessories 204 and that is capable of communicating securely with controllers 202. In some embodiments, coordinator 210 can present itself to accessories 204 as a controller and to controllers 202 as an accessory that provides services for communicating with other accessories (e.g., accessories 204); examples are described in above-referenced U.S. application Ser. No. 14/725,891. In some embodiments, coordinator 210 can be a device that is expected to stay in local environment 206 and that is expected to be powered on and available for communication most or all the time. (It is to be understood that coordinator 210 can occasionally be unavailable, e.g., in connection with software or firmware upgrades, power outages, or other intermittent occurrences.) For example, coordinator 210 can be implemented in a desktop computer, a Wi-Fi or access-point unit, a dedicated accessory-control base station, a set-top box for a television or other appliance (which can implement coordinator functionality in addition to interacting with the television or other appliance), or any other electronic device as desired.

In some embodiments, coordinator 210 and accessories 204 can communicate using a local area network (LAN), such as a Wi-Fi network and/or a point-to-point communication medium such as Bluetooth LE. It is to be understood that other communication protocols can be used. In some embodiments, controllers 202, accessories 204, and coordinator 210 can support a uniform accessory protocol as described above that can be supported using both Wi-Fi and Bluetooth LE as transports.

In the example of FIG. 2, controllers 202(1) and 202(4) are currently located in local environment 206 with accessories 204 and coordinator 210. For example, controller 202(1) can be on the same LAN as accessories 204 and coordinator 210. Controllers 202(2) and 202(3) are currently located outside local environment 206 but are connected to a communication network 208 (e.g., the Internet); such controllers are said to be "remote" from accessories 204 and coordinator 210. It is to be understood that controllers 202 can be mobile devices that are sometimes within local environment 206 and sometimes outside local environment 206. Accessories 204 need not be mobile and need not be connected to communication network 208 (although they can be if desired). In some embodiments, coordinator 210 can be connected to communication network 208 and can facilitate access to accessories 204 by remote controllers 202(2) and 202(3).

In the example shown, controllers 202 can communicate with accessories 204 via coordinator 210, and coordinator 210 can be said to act as a "proxy" for accessories 204. Coordinator 210 can communicate directly with accessories 204(1) and 204(2). In the case of accessory 204(3), coordinator 210 can communicate via "bridge" 212. Bridge 212 can operate to relay commands between a controller and an accessory; in some embodiments, bridge 212 and/or coordinator 210 can also translate between different communication protocols used by coordinator 210 or controller 202 and accessory 204(3). Further, in some embodiments, bridge 212 can be implemented as a "tunnel" that can provide secure end-to-end communication between coordinator 210 and accessory 204(3). Examples of proxies, bridges, and tunnels are described in above-referenced U.S. application Ser. No. 14/725,891.

In some implementations of network configuration 200, controllers 202 can be configured to communicate with accessories 204 via coordinator 210 whenever possible. Thus, as shown, controller 202(1), which is in local environment 206, communicates with coordinator 210 rather than directly with accessories 204, as do remotely located controllers 202(2) and 202(3). Direct communication between any of controllers 202 and accessories 204 can be limited, e.g., to situations where coordinator 210 is not available. In other embodiments, controllers 202 may communicate directly with accessories 204 whenever they happen to be in range of each other (e.g., on the same Wi-Fi network or within Bluetooth range). For instance, as shown, controller 202(4) can communicate directly with accessory 204(2).

In some embodiments, coordinator 210 can be used to coordinate access by multiple controllers 202 to multiple accessories 204. For example, rather than establishing a pairing between each controller 202 and each accessory 204, controllers 202 can each establish a pairing with coordinator 210, and coordinator 210 can establish a pairing with each accessory 204. The same pair setup and/or pair add processes used to establish a controller-accessory pairing can also be used to establish a controller-coordinator pairing, with the coordinator acting in the role of accessory. For purposes of coordinator-accessory pairing, the coordinator can assume the role of controller. Thus, coordinator 210 can present itself as an accessory when communicating with a controller (e.g., any of controllers 202) and as a controller when communicating with an accessory (e.g., accessory 204).

Coordinator 210 can facilitate operation of an accessory network including accessories 204. For example, coordinator 210 can maintain an environment model for the accessory network and can provide the model (or portions thereof) to various controllers 202; examples of an environment model are described below. Controllers 202 can operate accessories 204 by interacting with coordinator 210.

In some embodiments, coordinator 210 can manage permissions associated with the accessory network or environment model to limit access by specific controllers 202 to some or all accessories 204. In some embodiments, controllers 202 can preferentially route all requests to accessories 204 through coordinator 210, and in some embodiments, accessories 204 can be configured to communicate directly only with coordinator 210 and to ignore requests that come directly from controllers 202. This can allow coordinator 210 to enforce permissions and other restrictions on access to accessories 204.

Centralizing communication with accessories through coordinator 210 can simplify management of a controller network and/or accessory network (e.g., controllers 202 and accessories 204 in local environment 206). For example, if a new accessory is acquired, the new accessory need only establish a pairing with coordinator 210 in order to allow all controllers 202 to have access to the new accessory. Similarly, if a new controller 202 is acquired, the new controller 202 need only establish a pairing with coordinator 210 to allow the new controller to have access to all accessories 204. In an environment with multiple controllers (e.g., a family where the members each have multiple devices) and perhaps dozens of accessories, the time saving can be considerable.

It should be noted that in configuration 200, it is possible that one or more of the controllers (e.g., controller 202(1)) can be permitted to communicate with one or more accessories (e.g., accessory 204(1)) indirectly (via coordinator 210) but not directly, regardless of whether controller 202(1) is in local environment 206. This might occur, for instance, if controller 202(1) has established a pairing with coordinator 210 but not directly with accessory 204(1). In some instances, this can provide enhanced security; for instance, an accessory that has a pairing established with coordinator 210 can refuse to establish any other pairings. However, there may be cases where direct access is desirable, and establishing a direct pairing between a certain accessory, e.g., accessory 204(1) and one or more controllers 202 can be permitted. For example, suppose that accessory 204(1) is a door lock and controller 202(1) is a mobile phone. If a direct pairing between accessory 204(1) and controller 202(1) is established, a user can use controller 202(1) to lock or unlock accessory 204(1) via direct communication, thereby locking or unlocking the door. This can be useful, e.g., in the event that coordinator 210 is temporarily unavailable. In some embodiments, coordinator 210 can be used to indicate to accessory 204(1) which of controllers 202 are authorized for direct access, and accessory 204(1) can establish pairings with authorized controllers 202. In some embodiments, accessory 204(1) can be configured to accept direct communication from an authorized controller 202 only when coordinator 210 is not available. Thus, the general rule can be that all communications with accessory 204 go through coordinator 210, with exceptions made on a per-accessory and per-controller basis.

Coordinator 210 can operate as an intelligent agent for allowing controllers to operate accessories, rather than simply relaying messages. For example, coordinator 210 can establish a pairing with each of controllers 202 and a pairing with each accessory 204. When controller 202(1), for example, receives a user request to interact with a specific accessory, e.g., accessory 204(1), controller 202(1) can establish a first pair-verified session with coordinator 210 and provide its instructions for accessory 204 to coordinator 210 via the first pair-verified session. Coordinator 210 can receive the instructions, establish a second pair-verified session with accessory 204 and send appropriate control messages to accessory 204 via the second pair-verified session. In some embodiments, coordinator 210 can be privy to the content of the instructions, and in some embodiments, the messages sent to accessory 204 need not correspond to the instructions provided by controller 202(1). For example, while communicating with controller 202(1), coordinator 210 may also be in communication with another controller (e.g., controller 202(2)). Controllers 202(1) and 202(2) may each provide instructions for accessory 204 to coordinator 210. Coordinator 210 can analyze the received instructions, e.g., to detect and resolve conflicts such as where controller 202(1) instructs coordinator 210 to turn accessory 204 on while controller 202(2) instructs coordinator 210 to turn accessory 204 off. Coordinator 210 can be programmed with priority rules or other rules for resolving conflicts (e.g., "on" takes priority over "off"; instructions from a controller with admin permissions take precedence over instructions from a controller without admin permissions; etc.). Coordinator 210 can apply the priority rules to resolve any conflicts and can communicate instructions to accessory 204 based on the resolution. When a response is received from accessory 204, coordinator 210 can determine whether to send a corresponding message (or a different message) to controller 202(1) and/or to controller 202(2). As another example, coordinator 210 can enforce permissions established for various controllers 202 and/or accessories 204. For example, when one of controllers 202 sends a request, coordinator 210 can apply decision logic to determine whether the controller 202 that sent the request has appropriate permission; if not, coordinator 210 can reject the request. The decision logic can be as simple or complex as desired; for instance, a controller belonging to a child may be limited as to which hours of the day or for how long it can operate a particular accessory (e.g., a TV) while a parent's controller can have unlimited access, or a controller associated with a guest (e.g., a babysitter) may be restricted to operating a certain subset of the accessories. Thus, coordinator 210 is not limited to acting as a passive relay for messages between controllers and accessories but can actively intervene to resolve conflicting instructions, enforce any limitations that may exist on the privileges or permissions granted to particular controllers or users, and so on.

It will be appreciated that network configuration 200 is illustrative and that variations and modifications are possible. Any number of controllers and any number of accessories can be included in a network configuration. In some embodiments, coordinator 210 can be replaced with a proxy that relays messages between controllers and accessories without necessarily reading the content of the messages. In some embodiments, coordinator 210 can be omitted entirely. Some or all of accessories 204 may be accessible only within the local environment. Further, as described below, different controllers 202 may have different levels of permission in regard to accessing accessories 204; for instance, remote access via network 208 may be permitted for some controllers 202 but not for other controllers 202.

As noted above, coordinator 210 can be particularly useful in the context of an automated environment with a number of accessories that can be controlled. Examples include homes, cars or other vehicles, office buildings, campuses having multiple buildings, etc. For purposes of illustration, an example of an accessory network implementation for a home will be described; those skilled in the art with access to the present disclosure will understand that similar accessory networks can be implemented in other automated environments.

In one example of an accessory network, each accessory is connected to one or more controllers, and accessories can be controlled by sending messages, e.g., as described in above-referenced U.S. application Ser. No. 14/725,912 and U.S. application Ser. No. 14/614,914. This can be perfectly serviceable for small networks with just a few accessories. However, in some instances, particularly as the number of accessories increases, it can be helpful to establish meaningful (to a user) groups of accessories that can be managed in a coordinated fashion. Accordingly, certain embodiments of the present invention incorporate environment models usable to coordinate control across multiple accessories in an accessory network.

As used herein, an environment model can provide various logical groupings of the accessories in an environment. For example, a home environment can be modeled by defining "rooms" that can represent rooms in the home (e.g., kitchen, living room, master bedroom, etc.). In some cases, a room in the model need not correspond to a room in the home; for instance, there can be a "front yard" room or an "anywhere" room (which can be used to refer to accessories that are present in the home but whose location within the home is subject to change or has not been defined as a room). Each accessory in the home can be assigned to a room in the environment model, e.g., based on the actual physical location of the accessory. Rooms can be grouped into zones based on physical and/or logical similarities. For instance, an environment model for a two-level house might have an "upstairs" zone and a "downstairs" zone. As another example, an environment model might have a "bedrooms" zone that includes all bedrooms regardless of where they are located. The model can be as simple or complex as desired, e.g., depending on the size and complexity of the environment.

Where an environment model is defined, accessories represented in the environment model can be controlled individually or at the level of rooms, zones, or the whole model. For instance, a user can instruct a controller or coordinator to turn on all the outside lights or to turn off all accessories in a specific room.

Other groupings of accessories can also be defined. For example, in some embodiments, a user can augment an environment model by grouping various accessories into "service groups" that can include any set of accessories the user may desire to control together, at least some of the time. A service group can include accessories in any combination of rooms or zones, and the accessories in a service group can be homogeneous (e.g., all upstairs lights) or heterogeneous (e.g., a light, a fan, and a TV). In some embodiments, a user can provide a single instruction to a controller to set the state of an entire service group (e.g., turn the group on or off). While not required, the use of service groups can provide another degree of flexibility in coordinating control over multiple accessories.

As another example, an environment model can include user-defined and/or automatically generated rules to automate common interactions involving one or more accessories. For example, a "trigger" can be defined to allow one or more actions to be taken in response to detecting some set of triggering events and/or conditions, such as "turn on the living room lights when the user comes home," or "when the user says 'good night, home,' turn off all downstairs lights and lock all doors." A wide range of behaviors can be automated by defining appropriate rules.

In some embodiments, the environment model for a given environment can be represented as a data object (or set of data objects). The environment model can be created on a controller associated with the environment (e.g., a controller with admin privileges) and can be shared with other controllers through a synchronization operation. For instance, controllers 202 of FIG. 2 can synchronize with a "master" copy of the environment model maintained by coordinator 210 (which can receive updates from controllers 202), or cloud-based synchronization (in which the master copy is stored in a location accessible via network 208 and automatically synchronized with the controllers and coordinator (s) associated with the environment) can be used. Accordingly, all controllers and coordinators associated with a given environment can have shared access to the same environment model.

Additional examples related to defining and using an environment model are described in above-referenced U.S. application Ser. No. 14/725,912. The particular content of an environment model can be varied as desired without departing from the scope of the claimed invention.

Example User Permissions

A local environment may be frequented by multiple individuals, each of whom may have one or more electronic devices capable of operating as one of controllers 202. For example, each resident of a home may have a smart phone, tablet, laptop computer, or other device(s) that can communicate with accessories 204 installed or located in the home. In order to avoid the drudgery of each user having to set up each device, it may be desirable for the environment model to include information about authorized users and the permissions granted to various users.

Authorized users can be identified by reference to any identifier that uniquely identifies the user and provides some level of assurance that a controller device that purports to belong to a particular user actually does. For example, in some embodiments, all of a user's controller devices might be linked to a cloud-based data service where the user maintains an account. Via the user's account, the cloud-based data service can provide data storage and retrieval for the user's devices. In some embodiments, the cloud-based data service can also provide device management services such as synchronizing data across a user's devices (assuming all devices are linked to the same user account), updating device firmware, providing access to application programs executable on the device (and updates to such programs), and so on. In some embodiments, the cloud-based data service can also be used to manage synchronization of the environment model across user devices; examples are described below. Where controller devices are linked to a cloud-based data service, the user identifier can be the username (or other user ID) used to access the cloud-based data service. This can provide for a convenient system of globally unique user names. In some embodiments, the fact that a given controller device is signed into a particular user account at a cloud-based data service can establish that the controller device "belongs to" a particular user. The iCloud data management service of Apple Inc., assignee of the present application, is an example of a service that can provide user identification and identity verification via its associated "Apple ID"; other services and systems of user identifiers can also be used In some embodiments, different authorized users can have different degrees of access to the automated environment. For example, a user who initially creates an environment model for a particular environment (e.g., by assigning the model a name and adding at least one accessory) can be designated as the "owner" of the environment model. The owner can be granted unlimited permission to interact with accessories and to modify the environment model, including by adding and removing accessories; adding and removing other users from a list of authorized users; changing permissions granted to other users; and modifying the model itself (e.g., by defining or redefining rooms, zones, triggers, etc.). In some embodiments, the owner can change ownership of the automated environment, e.g., by designating another user as owner. For purposes of the present description, it is assumed that at any given time, there is exactly one user designated as the owner of an environment model.

Users who are not the owner may be granted "administrator" (or "admin") permission by the owner. As used herein, admin permission can include permission to interact with accessories and to modify some aspects of the environment model. In some embodiments, a user with admin permission can make any modification to the environment model except removing or replacing the owner. Some embodiments may provide multiple levels of admin permission, with each level corresponding to a different subset of possible permissions. For example, a "level 1 admin" might be allowed to define triggers but not add or remove users; a "level 2 admin" might be allowed to define triggers and add or remove users; and so on.

Other users can be granted "basic" permission, by the owner or by an admin with appropriate permission. As used herein, a "basic" user has permission to interact with the accessories but limited ability to modify the environment model. For instance, a basic user may be able to add an accessory but not to remove an accessory or to modify definitions of rooms, zones, triggers, and so on. Basic users can also be restricted from adding or removing other users or changing permission levels of any user.

In some embodiments, "basic" permission can be the lowest level of permission supported. Other embodiments may provide other levels, such as a "guest" permission. The guest user may be permitted to interact with accessories (or with a subset of accessories) but not to modify the environment model in any manner.

To manage the various permissions, it can be useful to provide an access list as part of the environment model. The access list can identify individual users and/or devices that are permitted to access and/or modify the environment model (including any accessories that have been added to the model) and the particular permissions granted to each user and/or device.

FIG. 3 shows a table 300 that provides an access list for an environment model according to an embodiment of the present invention. For purposes of illustration, it is assumed that table 300 is associated with an environment model for a home (also referred to as a "home model") and that the home thus modeled is the residence of four individuals: "Mom," "Dad," "Jill," and "Jack." It is assumed that Mom and Dad are adults, while Jill and Jack are minor children. It is also assumed that others may sometimes need access to the home model. For example, "Sitter" can be a person engaged by Mom and/or Dad to watch the children while the adults are away (or to watch the house while everyone is away). It is assumed that each person has an established user identity (e.g., an Apple ID or other unique and verifiable identifier). For each person with access the home, table 300 lists a user name (field 302), user identifier (or ID) (field 304), controller devices belonging to that user (field 306), and permission level granted to that user (field 308).

The user name (field 302) can be assigned when the user is added to the environment model, and can be a name that will be recognized by users of the environment. User ID (field 304) can be the unique user identifier for the user account at the cloud-based data service (in this example, the identifier is an email address associated with the user's account).

As shown in field 306, a user can have any number of controller devices: in this example, Dad has four, Mom and Jill each have two, Jack and Sitter each have one. In this example, permissions are granted per-user rather than per-device (as shown in field 308), so that a user's experience can be consistent across all of his or her devices. Per-device permissions can be implemented if desired, and a combination of per-user and per-device permissions can be supported. For example, Dad's devices include a set-top box that may be used in combination with a TV to which the entire household has access. The set-top box thus may have owner permission and be able to modify the environment model without restriction. However, the set-top box may present a more limited user interface for interacting with the environment (e.g., presenting user-operable controls or affordances to control accessories but not to modify the environment model), to prevent anyone other than Dad from making unauthorized modifications.

In embodiments where controllers control accessories by communicating with a coordinator (e.g., coordinator 210 of FIG. 2), coordinator 210 can consult table 300 to determine whether a user has permission to perform a requested operation (e.g., controlling a particular accessory) and can communicate control messages to the accessory only if the user has permission. Where interaction with accessories is mediated through coordinator 210, it is desirable that coordinator 210 has privilege to control all accessories in environment; for instance, as a matter of design choice it can be required that coordinator 210 for a given environment be a device that belongs to the user with owner permission for that environment (e.g., a set-top box that is signed in to the owner's account at the cloud-based data service). In such embodiments, an accessory might or might not know which controller was the ultimate source of a control message received from the coordinator.

It should be noted that the permissions established by the environment model can be different from the protocol privileges described above with reference to FIG. 1. Thus, for instance, a particular user (or controller) can have protocol admin privilege with respect to a particular accessory without having admin permission in the environment model. In some embodiments, audit procedures, examples of which are described below, can be used to reconcile the privileges granted by accessories with the permissions established by the environment model.

Synchronization of Environment Model

It may be desirable that all users and controller devices interacting with an automated environment share a common environment model. In some embodiments, this can be accomplished using cloud-based synchronization techniques. A "master" copy of the environment model can be stored at a cloud-based data service, and each controller device can synchronize a locally stored copy of the environment model with the master copy. The synchronization operation can include, for example, determining whether the master copy or local copy is more recent and replacing the older copy with the newer.

Figure 4:
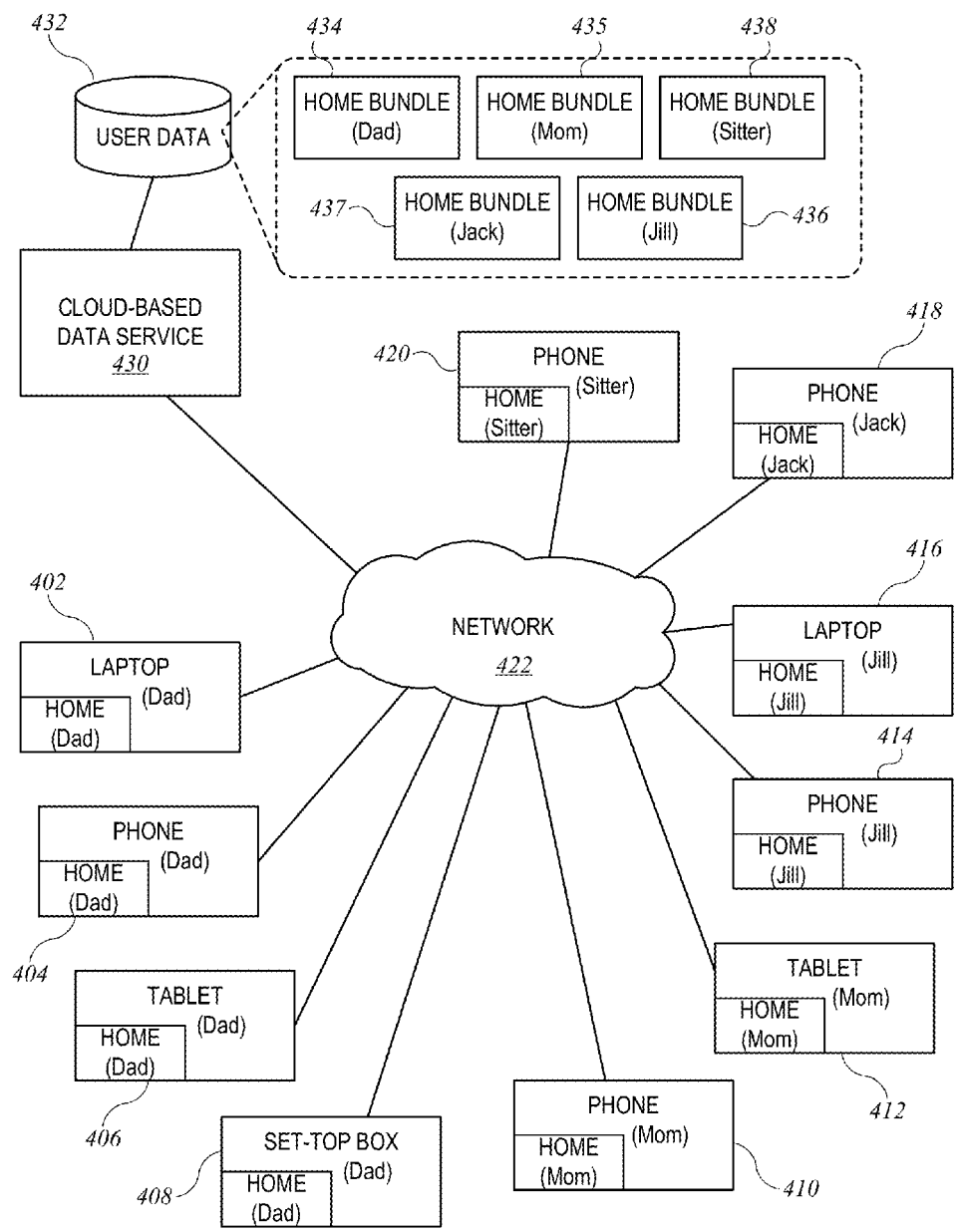
FIG. 4 shows an example of cloud-based synchronization that can be used in connection with some embodiments of the present invention.

FIG. 4 shows an example of cloud-based synchronization that can be used in connection with some embodiments of the present invention. The users and user devices correspond to table 300 of FIG. 3. Thus, user Dad has four controller devices: laptop 402, phone 404, tablet 406, and set-top box 408. User Mom has phone 410 and tablet 412. User Jill has phone 414 and laptop 416. User Jack has phone 418. User Sitter has phone 420. All user devices 402-420 can communicate via network 422 (which can be, e.g., the internet) Each user has an account at cloud-based data service 430. Cloud-based data service 430 maintains a user data repository 432, which contains personal data for various users. In this example, user data repository 432 stores a separate "home bundle" 434-438 for each user, and each user's devices synchronize with that user's home bundle. Accordingly, Dad's laptop 402, phone 404, tablet 406, and set-top box 408 each synchronize with home bundle 434. Mom's phone 410 and tablet 412 synchronize with home bundle 435. Jill's phone 414 and laptop 416 synchronize with home bundle 436. Jack's phone 418 synchronizes with home bundle 437. Sitter's phone 420 synchronizes with home bundle 437. In some instances, a user may frequent multiple automated environments (e.g., a primary residence and a secondary home, such as a relative's home or vacation home or the like), and user data repository 432 can store a separate home bundle for each automated environment a particular user frequents.

The contents of home bundles 434-438 can be opaque to cloud-based data service 430. For example, each home data bundle 434-438 can be encrypted using a key that is shared among the devices of the associated user but not shared with cloud-based data service 430.

In some embodiments, home bundles 434-438 all represent the same environment model and may be encrypted with the same key. For example, suppose that user Dad initially creates the environment model on tablet 406. Dad (or tablet 406) can define a key to be used to encrypt the environment model, use the key to encrypt the environment model, and upload the model as home bundle 434, which can thereafter be automatically synchronized across all of Dad's devices (e.g., laptop 402, phone 404, tablet 406, and set-top box 408). As part of adding another user (e.g., Mom) to the environment model, Dad (or one of Dad's devices) can provide its local copy of the environment model and the key to Mom (or one of Mom's devices, e.g., phone 410) via a local communication channel. Mom's device can upload the model as home bundle 435, which can thereafter be automatically synchronized across all of Mom's devices. Users Jack, Jill, and Sitter, and their associated home bundles 436, 437, 438, can be added in a similar manner. In some embodiments, the content of home bundles 434-438 can all be identical. In other embodiments, the content of different home bundles can be different. For example, if user Dad is the owner, then Dad's home bundle 434 may include a complete representation of the home; home bundles for other users may include a subset of the data in Dad's home bundle 434, depending on permissions. For instance, user Sitter has guest permission, and Sitter's home bundle 438 may be filtered to exclude particular accessories, triggers, or other elements of home data that user Sitter does not have permission to access.

It should be noted that cloud-based data service 430 does not need to know that home bundles 434-438 contain the same (or related) data or have any relationship to each other. As described below, when updates are made to the underlying environment model, the device that makes the update can propagate it to a representative device of each user, to keep the model consistent across all users. The propagation can exploit cloud synchronization across a user's devices.

Figure 5:
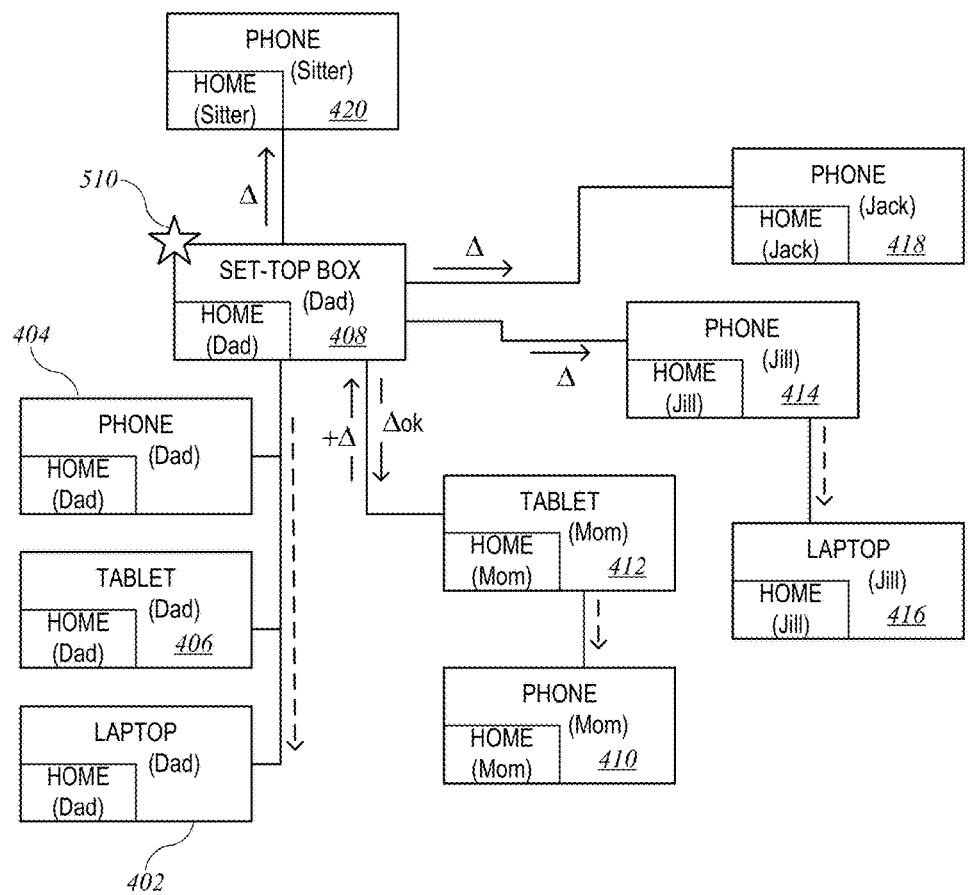
FIG. 5 shows an example of propagating an update to an environment model according to an embodiment of the present invention.

FIG. 5 shows an example of propagating an update to an environment model according to an embodiment of the present invention. The update can be propagated among the devices of FIG. 4, using cloud sync to synchronize the environment model across a user's devices and other channels to communicate updates between devices of different users. In this example, user Mom (who has admin permission) can make a change to the environment model using one of her devices, in this case tablet 412. The change (Δ) can be propagated to other devices.

As described below, in accordance with some embodiments of the present invention, it can be required (e.g., by the software implementation) that updates to the environment model be coordinated by a coordinator device (e.g., coordinator device 210 of FIG. 2) that belongs to the owner of the environment. In some embodiments, the environment model can include an indication of which device is the designated coordinator; various techniques can be used to designate a coordinator, and in some embodiments there may be a policy that at any given time there is exactly one designated coordinator for the environment. For purposes of the present description, it is assumed that set-top box 408 (which belongs to Dad, the owner of the environment model) has been designated as the coordinator, as indicated by star 510. (The particular operations used to designate a coordinator are not relevant to understanding the claimed invention.)

Accordingly, Mom's tablet 412 can send an update request (+Δ) to set-top box 408. Set-top box 408 can apply various decision logic to determine whether the update should be made; examples are described below. If the update should be made, set-top box 408 can send a positive acknowledgement (Δok) to Mom's tablet 412. Thereafter, Mom's tablet 412 can cloud-sync with home data bundle 435, propagating the update to Mom's phone 410; updates propagated by cloud-sync are indicated by dashed arrows in FIG. 5.

In addition to sending the positive acknowledgement to Mom's tablet, set-top box 408 can also update its local copy of the environment model and cloud-sync with home data bundle 434, propagating the update to Dad's other devices (phone 404, tablet 406, laptop 402), as shown by the dashed arrow.

Further, set-top box can push its (updated) local copy of the environment model to one device of each of the other users of the environment model. For instance, as shown by the arrows labeled Δ, set-top box 408 can push the update to Jill's phone 414, Jack's phone 418, and Sitter's phone 420. These push operations can use the same mechanism that was originally used to deliver the environment model to the user's device when the user was added to the environment. Examples of suitable mechanisms include establishing a secure connection on a Wi-Fi network to which both devices are joined, ad hoc networking techniques (e.g., the AirDrop® software feature of Apple Inc. or the like), a message relay service that supports secure message delivery between user devices (e.g., the iMessage® software feature of Apple Inc.); other techniques can also be used. The updated environment model can be propagated as a home bundle that is encrypted using the shared encryption key; the receiving device has the key and can decrypt the received bundle.

Each device that receives the update from set-top box 408 can then cloud sync with the corresponding one of home data bundles 436-438 to update the data stored at cloud-based data service 430. Jill's laptop 416 can obtain the update via cloud sync with Jill's home data bundle 436. In this manner, the environment model can be synchronized across all users' devices.

It should be understood that other synchronization techniques can be used. For example, some embodiments can provide cloud-based synchronization of a home bundle across devices belonging to different users. For example, upon creating or modifying home bundle 434, Dad may be able to indicate to cloud-based data service 430 that home bundle 434 should be shared with the other users in the home. Cloud-based data service 430 can create a "sync list" including these users and synchronize home bundle 434 with all devices of all users on the sync list. Other techniques for synchronizing data across devices can also be used.

In some embodiments, the environment model can be shared using multiple home bundles (per user, where applicable), with each home bundle including a subset of the environment model data. This can reduce the amount of data that needs to be transferred when propagating an update. All bundles can be encrypted with the same key, or each bundle can have a different key.

Example Process for Coordinating Updates

Regardless of the particular synchronization technique used, coordinating updates by users who share admin permission for an environment model (including the owner) can be useful, e.g., to prevent conflicting updates by different admins.

Figure 6:
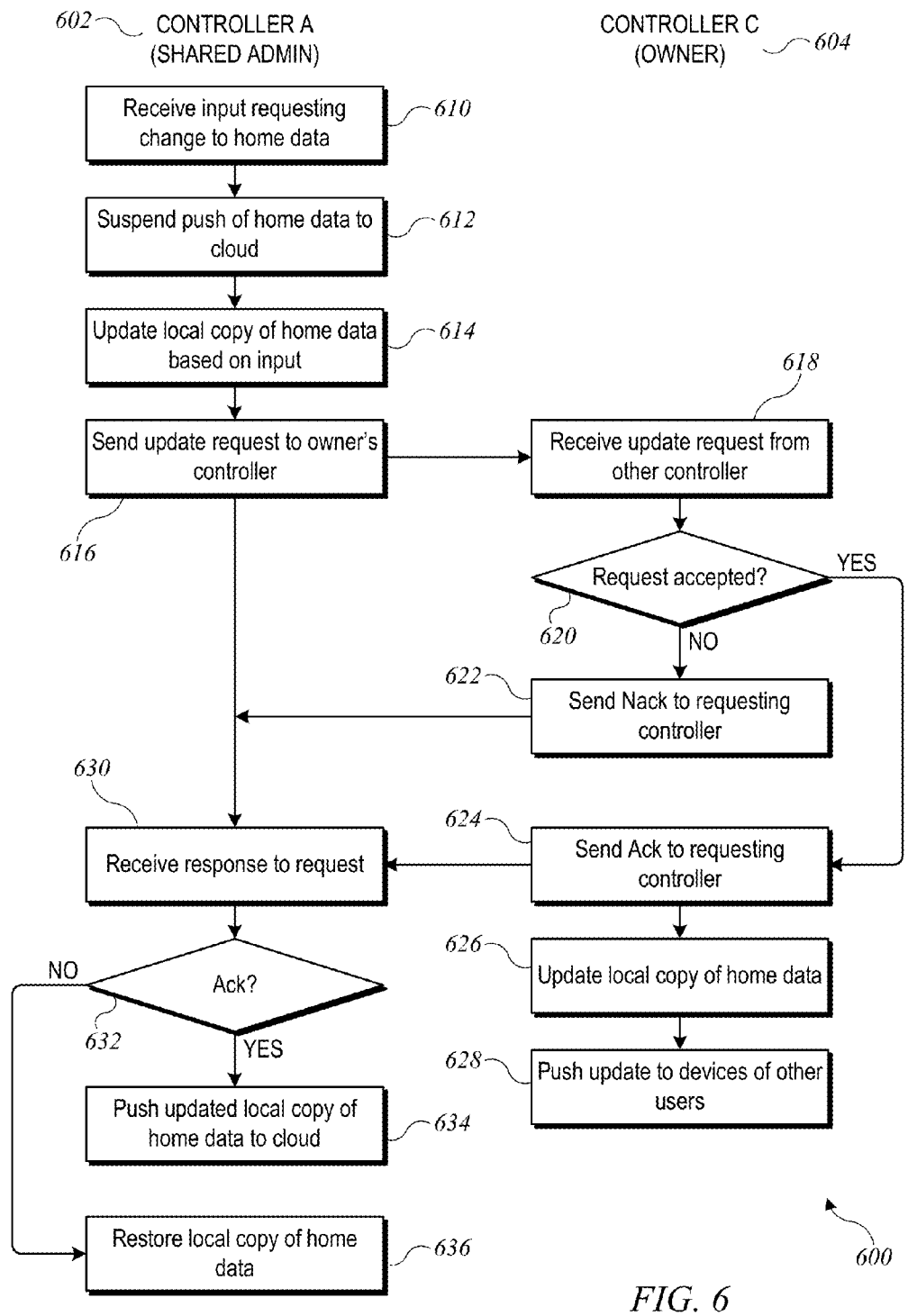
FIG. 6 shows a flow diagram of a process for coordinating updates to an environment model according to an embodiment of the present invention.

FIG. 6 shows a flow diagram of a process 600 for coordinating updates to an environment model according to an embodiment of the present invention. Portions of process 600 can be implemented in a first controller ("controller A") 602, and other portions of process 600 can be implemented in a second controller ("controller C") 604. Controller A 602 can be any controller that has admin permission for the environment model (e.g., any of Mom's devices 410, 412), and Controller C 604 can be the designated coordinator 510 for the environment model (which can be, e.g., set-top box 408) or another controller that belongs to a user with owner permission.

At block 610, controller A 602 can receive an input requesting a change to the environment model (also referred to as home data). For example, the user of controller A may receive input defining a new room, moving an accessory from one room to another, adding or removing a user, defining or modifying a trigger, adding an accessory, or the like.

At block 612, controller A 602 can suspend pushing of its home data (i.e., its local copy of the environment model) to the cloud. This allows controller A 602 to immediately implement changes to the environment model in its local user interface, as the user might expect, without propagating the changes to any other controllers; updates can be propagated to other devices after controller C has granted approval. As will be apparent, this also makes it simple for controller A 602 to "back out" of any changes that are rejected by controller C 604. It is to be understood that, to the extent that controller A synchronizes with multiple home data bundles in the cloud (e.g., if the user of controller A has multiple homes or if the home data for a single home is divided among multiple bundles), the suspension of pushing can apply only to the particular home data bundle that includes the data for which a change is requested. In addition, suspending pushing of home data to the cloud does not require that controller A 602 also suspend receiving of updates to the home data from the cloud; if an update is received from the cloud during execution of process 600, controller A 602 can apply the update locally. If the update is incompatible with the change requested by the user at block 610, controller A 602 can abort process 600, similarly to operations described below.

At block 614, controller A 602 can update its local copy of the home data based on the received input. Because cloud sync is suspended, this update does not propagate to any other copy of the home data (and is not yet visible to any other controller or user); however, updating the local copy allows the user of controller A 602 to begin interacting with the updated environment model without delay. At block 616, controller A 602 can send an update request to controller C 604. The update request can include a description of the change that was made to controller A's local copy of the home data at block 614, or the entire home data bundle, or any other data that controller C 604 can use to process the update request.

At block 618, controller C 604 can receive the update request from controller A 602. At block 620, controller C 604 can determine whether to accept or reject the update request. Various decision logic can be implemented. For instance, as noted above, a user with admin permissions may not be permitted to make certain changes; updates for which the requesting user does not have permission can be rejected. As another example, another user may be concurrently requesting a conflicting update. If all update requests are sent to and processed by the same controller C 604, controller C 604 can detect conflicting updates and decide which (if any) to accept. For certain types of changes, such as adding accessories or adding users, additional operations may be performed by controller C 604 in connection with determining whether to accept or reject the request; specific examples including such additional operations are described below.

If, at block 620, controller C 604 determines to reject the request, then at block 622, controller C 604 can send a negative acknowledgement (Nack) to controller A 602 to indicate that the request is rejected. If, on the other hand, controller C 604 determines to accept the request, then at block 624, controller C 604 can send a positive acknowledgement (Ack) to controller A 602 to indicate that the request is accepted. In addition, controller C 604 can incorporate the update into the environment model for all controllers. For example, at block 626, controller C 604 can update its local copy of the home data (environment model); this update can propagate via cloud sync to all other controllers belonging to the same user as controller C 604. At block 628, controller C 604 can push the update to one device of each other user of the environment model. For instance, referring to FIG. 4, if the update originated from Mom's tablet 414 and controller C 604 is set-top box 408, then at block 628, set-top box 408 can push the update to Jill's phone 414, Jack's phone 418, and Sitter's phone 420. It is not necessary for set-top box 408 to push the update to any of Mom's devices, since one of Mom's devices is the source of the update.

Referring again to FIG. 6, at block 630, controller A 602 can receive the response (either Ack or Nack) to the request from controller C 604. At block 632, controller A 602 can determine whether the response is positive (Ack) or negative (Nack). In the event of a positive acknowledgement, at block 634, controller A 602 can push its local copy of the home data (which was updated at block 614) to the cloud, ending the suspension that was imposed at block 612. This can result in the updated home data being synched via the cloud to other controller devices belonging to the user of controller A 602. In the event of a negative acknowledgement, at block 636, controller A 602 can restore its local copy of the home data to its state prior to the failed update, e.g., by overwriting its local copy with the content of home data bundle 435 from cloud-based data service 430, which has the effect of undoing the change made at block 614. Alternatively, if controller A 602 maintains a record of the previous state of any data that was updated at block 614, controller A 602 can restore the data locally, without a pull from the cloud. After restoring the home data, controller A can resume normal pushing of home data to the cloud, ending the suspension of push that was imposed at block 614. In some embodiments, controller C 604 can notify its user that the change was rejected, and the user may or may not be offered the option to retry. Whether an option to retry is offered may depend on the reason for rejecting the change, which can be communicated by controller C 604 in the Nack response.

Process 600 is illustrative and variations and modifications are possible. Process 600 can be used to manage all updates to an environment model. For example, a coordinator for the environment may operate as controller C, and any other controller that receives input requesting a change can operate as controller A. Thus, in some instances, controller C and controller A can be two different devices belonging to the owner of the environment model. (Since both devices make the same change to the environment model, it does not matter which is first to sync the updated home data to the owner's account at the cloud-based data service.) Process 600 or similar processes can be used to make any type of change to the environment model.

In some cases, the change may entail further processing by controller C 604. For example, in the case of adding a trigger, controller C 604 may determine whether the proposed new trigger conflicts with existing triggers. Triggers may conflict, for example, if the same triggering conditions result in conflicting actions. In some instances, a trigger may create a loop, e.g., where the resulting action for one trigger is the triggering condition for another and vice versa (longer loops involving any number of triggers are possible). In some instances, it may be desirable to merge a new trigger into an existing trigger; for example, the new trigger may have the same triggering condition as an existing trigger but different (non-conflicting, but possibly duplicative) resulting actions. In some embodiments, controller C 604 may reject a request that creates a conflict, and in some embodiments, the rejection may include a proposed modification that would make the added trigger acceptable. The proposed modification can include, e.g., merging triggers where appropriate, removing an action that results in a conflict, or the like. Controller A can present the proposed modification to its user and send a revised update request that incorporates the modification; controller C can accept the revised update request, which can be propagated to all devices as described above.

Example Process for Adding Accessories

As another example, adding an accessory to the environment model can include establishing a paring between the accessory and each controller (or user) associated with the environment, in addition to adding information about the accessory to the environment model. As noted above, in some embodiments, the pairing for a controller can be based on a key that is shared among all controllers belonging to a particular user, so that establishing one pairing per user is sufficient. In some embodiments, the establishing of pairings can be managed by a controller that belongs to the owner.

Figure 7A:
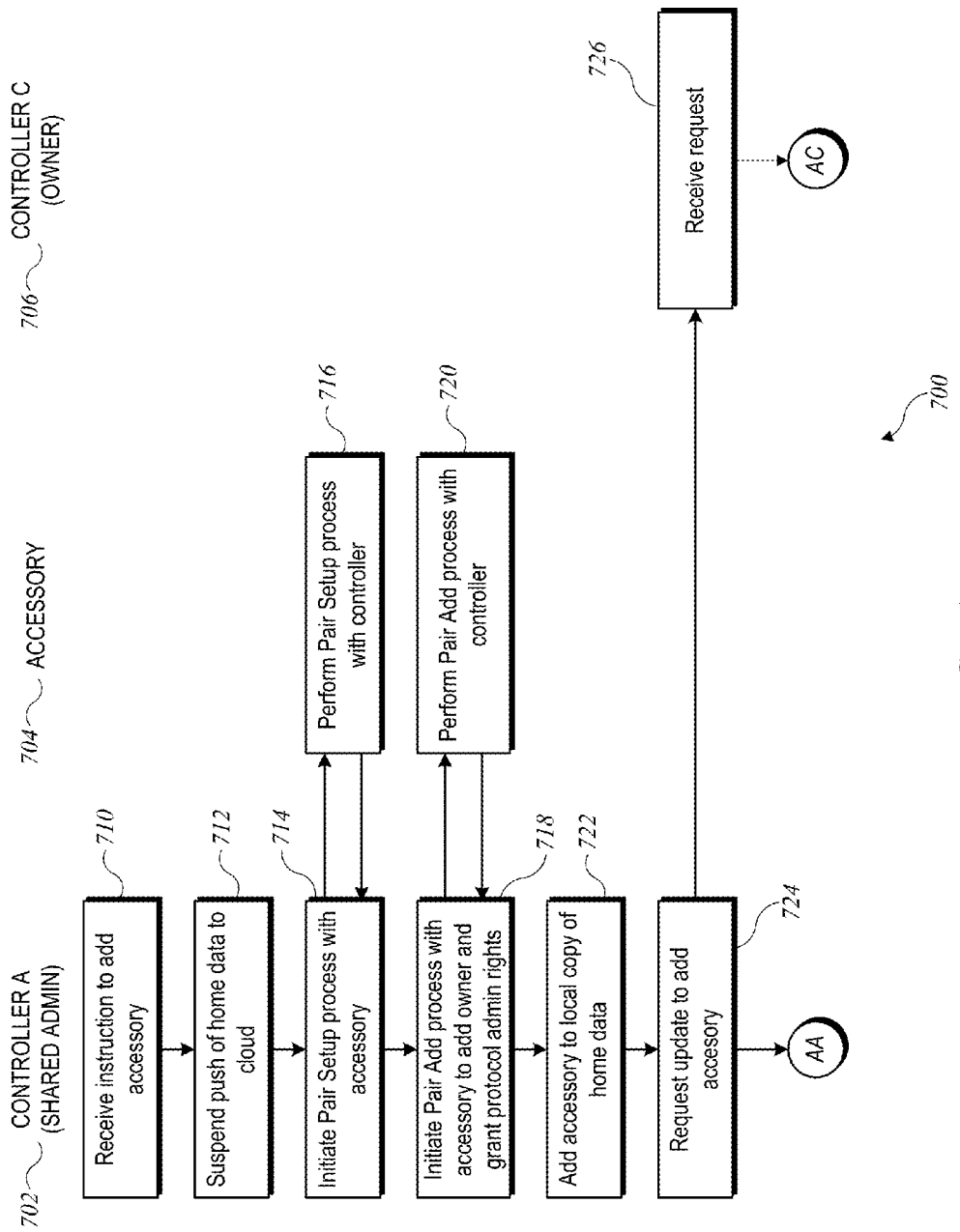
FIGS. 7A and 7B show a flow diagram of a process for a user with admin permission adding an accessory to an automated environment according to an embodiment of the present invention.
Figure 7B:
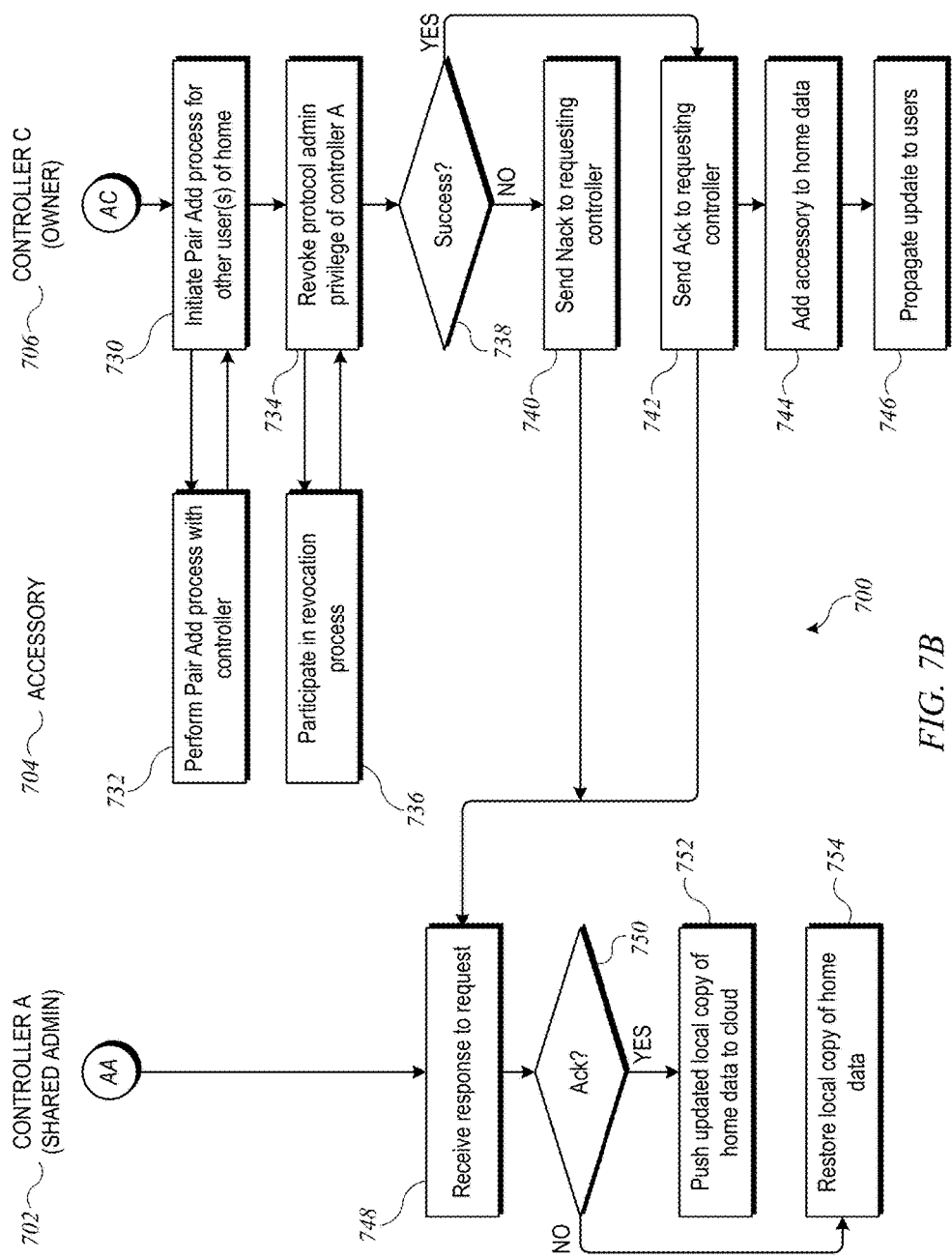

FIGS. 7A and 7B show a flow diagram of a process 700 for a user with admin permission adding an accessory to an automated environment according to an embodiment of the present invention. Portions of process 700 can be implemented in a first controller ("controller A") 702, other portions of process 700 can be implemented in a second controller ("controller C") 704, and still other portions of process 700 can be implemented in an accessory 706. Controller A 702 can be any controller that has admin permission for the environment model (e.g., any of Mom's devices 410, 412); Controller C 704 can be the designated coordinator 510 for the environment model (which can be, e.g., set-top box 408) or another controller that belongs to a user with owner permission; and accessory 706 can be any accessory that is to be added to the environment, such as a newly acquired accessory.

Referring first to FIG. 7A, at block 710, controller A 702 can receive an instruction to add accessory 706. For example, a user may operate a user interface of controller A 702 to indicate that controller A 702 should search for unpaired accessories. Controller A 702 can perform the search, e.g., by scanning for advertisements that identify a particular device as an unpaired accessory that supports the uniform accessory protocol, and can identify accessory 706 by its advertisement. Other techniques can also be used.

At block 712, controller A 702 can suspend pushing of its local copy of the home data to the cloud; this can be similar to block 612 of process 600 described above. At block 714, controller A 702 can initiate a pair setup process of the uniform accessory protocol with accessory 706, and at block 716, accessory 706 can participate in the pair setup process. The pair setup process can be as described above and can include automatically granting protocol admin privilege to controller A 702. Thereafter, at block 718, controller A 702 can use its protocol admin privilege to initiate a pair add process with accessory 706, to add a long-term public key of the owner as an established pairing with accessory 706. At block 720, accessory 706 can participate in the pair add process. The pair add process can proceed as described above and can include controller A 702 indicating to accessory 706 that the added pairing should also be granted protocol admin privilege. In some embodiments, the long-term public keys for each authorized user of the automated environment can be included with the user data in the environment model, allowing controller A 702 to know the long-term public key for the owner even if controller A 702 does not belong to the owner. (As long as only public keys—not the corresponding private keys—are shared in this manner, security is not compromised.) After execution of blocks 718 and 720, accessory 706 has established pairings with two controllers (or users), both of which have protocol admin privilege. (If the pair setup and pair add operations do not both complete successfully, process 700 can be aborted.)

At block 722, controller A 702 can update its local copy of the home data (environment model) to add accessory 706. For example, the long-term public key of accessory 706 (obtained during pair setup) can be added to the data, and accessory 706 can be assigned to a room (e.g., based on user input or automatically based on a current location of controller A 702). As at block 614 of process 600, this update can occur while synchronization of controller A's home data is suspended, so that the update is not propagated to other controllers but a user operating controller A can immediately begin interacting with accessory 706.

At block 724, controller A 702 can send a request to controller C 704 to request an update to add the accessory to the environment model. In some embodiments, the notification can be in the form of an update request similar to the update request sent at block 616 of process 600; the notification can include an accessory identifier, the long-term public key of the accessory, an identifier of the room to which the accessory is being added, and any other information that may be useful to controller C 704 in processing the request to add the accessory. Controller A 702 can receive the request at block 726, similarly to block 618 of process 600.

As a result of blocks 718 and 720, when controller C 704 receives the request at block 726 to add accessory 706, controller C 704 already has an established pairing with accessory 706 and has protocol admin privilege. Referring to FIG. 7B, at block 730, controller C 704 can use its protocol admin privilege to initiate one or more additional pair add processes with accessory 706; at block 732, accessory 706 can participate in the pair add process(es). In some embodiments, controller C 704 can add a pairing for each user of the automated environment, other than the user of controller C 704 and the user of controller A 702 (who already have established pairings). In some embodiments, access to some accessories (e.g., accessories located in a particular room or having a particular capability) may be restricted to a subset of users; for instance, users with guest permission may not be allowed to operate accessories in certain rooms (such as the master bedroom). Where such restrictions exist, controller C 706 can skip adding pairings for any users who are restricted by policy from operating particular accessories; accordingly, it is not required that a pairing be established for every user of the automated environment.

In some embodiments, at block 734, controller C 704 can revoke the protocol admin rights of controller A 702 at accessory 706; accessory 706 can participate in this process at block 736. This can result in only the owner having protocol admin privilege with respect to all accessories in the environment, regardless of which user added a particular accessory.

At block 738, controller C 704 can determine whether the pair add process(es) at blocks 730 and 732 and the revocation process at blocks 734 and 736 completed successfully. If not, then at block 740, controller C 706 can return a Nack response to controller A 702, similarly to block 622 of process 600. If all pair add processes complete successfully, then at block 742, controller C 706 can return an Ack response to controller A 702, similarly to block 624 of process 600. (Thus, in the case of adding an accessory, the ability to perform pair add with the new accessory can be viewed as part of the decision logic at block 620 of process 600.)

In addition, controller C 704 can incorporate the update into the environment model for all controllers. For example, at block 744, controller C 604 can update its local copy of the home data (environment model); this update can propagate via cloud sync to all other controllers belonging to the same user as controller C 604 (similarly to block 626 of process 600). At block 746, controller C 604 can push the update to one device of each other user of the environment model (similarly to block 620 of process 600).

At block 748, controller A 702 can receive the response (either Ack or Nack) to the request from controller C 704. At block 750, controller A 702 can determine whether the response is positive (Ack) or negative (Nack). In the event of a positive acknowledgement, at block 752, controller A 702 can push its updated local copy of the home data to the cloud, similarly to block 634 of process 600. This can result in the updated local copy (from block 722) being synched via the cloud to other controller devices belonging to the user of controller A 702. In the event of a negative acknowledgement, at block 754, controller A 602 can restore its local copy of the home data, similarly to block 636 of process 600. This has the effect of undoing the addition of the accessory at block 722. In some embodiments, controller C 704 can notify its user that the accessory was not added, and the user may or may not be offered the option to retry.

Process 700 is illustrative and variations and modifications are possible. Process 700 can be used for adding an accessory by any controller that has permission to add accessories to the environment model (e.g., any controller belonging to a user the model identifies as having permission to add accessories). For example, a coordinator for the environment may operate as controller C, and any other controller that receives input related to adding an accessory can operate as controller A. Thus, in some instances, controller C and controller A can be two different devices belonging to the owner of the environment model. (Since both devices make the same change to the environment model, it does not matter which is first to sync the updated home data to the owner's account at the cloud-based data service.) In some embodiments, controller C can enforce the permission scheme of the environment model. For instance, before initiating pair add at block 730, controller C can determine whether controller A has permission to add accessories to the environment model; if not, controller C can send the Nack response at block 736 without attempting to add any pairings to accessory 706. In some embodiments, if controller C sends the Nack response, it can also remove the pairings of accessory 706 with itself and/or with controller A. Processes similar to process 700 can be used in any instance where it is desirable to have controller A perform operations prior to sending an update request to controller C.

In connection with adding accessories, it may be desirable to make sure that accessories have the expected pairings with controllers (or users if the pairing is per-user rather than per-controller). Accordingly, in some embodiments, a controller operating as the coordinator for an automated environment may periodically audit the accessories included in the environment model to verify that the accessories have the expected pairings (and only the expected pairings).

Figure 8:
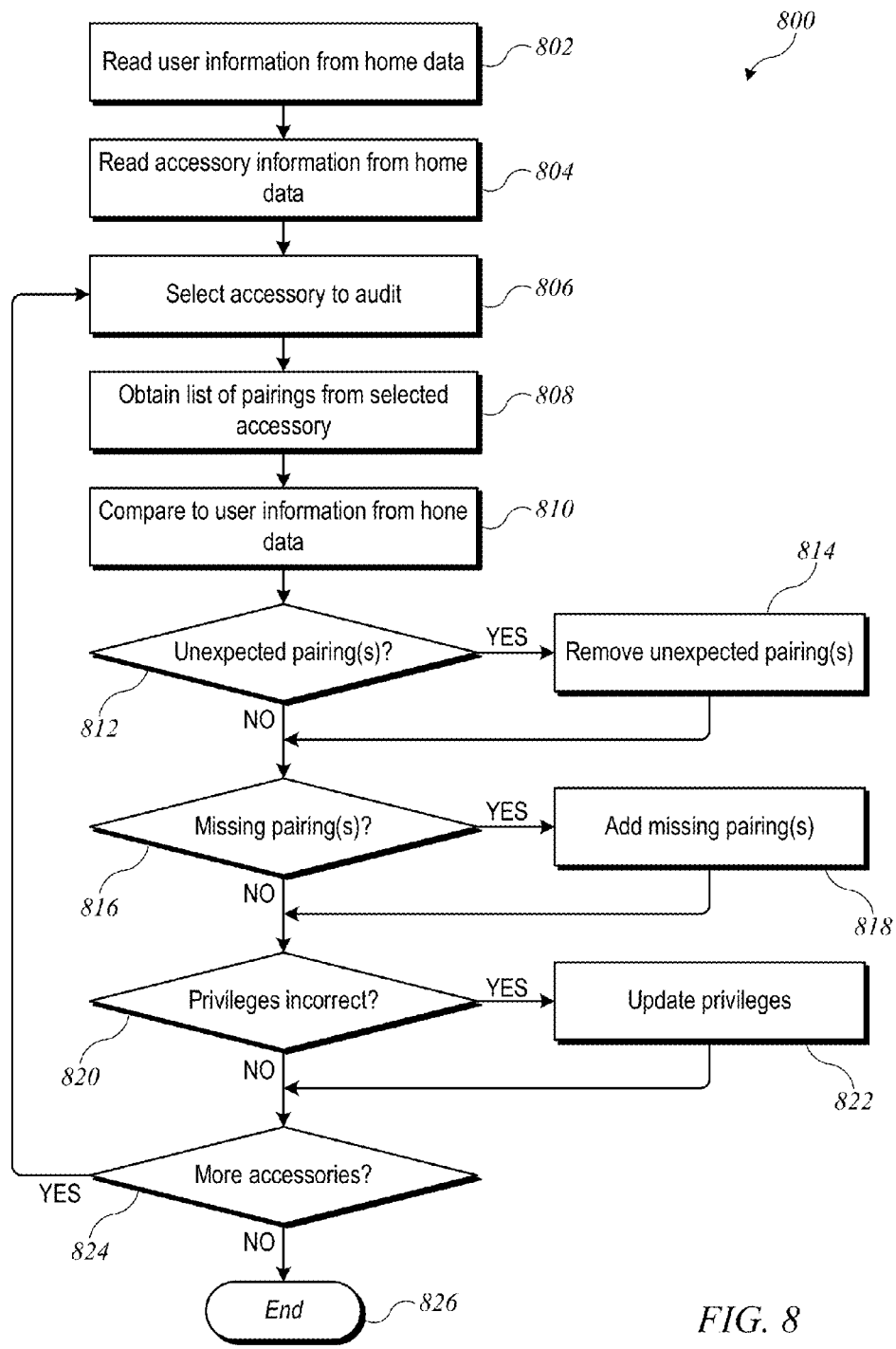
FIG. 8 is a flow diagram of an audit process according to an embodiment of the present invention.

FIG. 8 is a flow diagram of an audit process 800 according to an embodiment of the present invention. Process 800 can be performed in a controller that has protocol admin privileges with respect to the accessories in an automated environment model, e.g., by set-top box 408 or other device acting as designated coordinator 510 in FIG. 5.

At block 802, coordinator 510 can read user information from the home data (environment model) to establish a list of users who should have access to accessories. This list may change from time to time as users are added to or removed from the home. (For instance, user Sitter in examples above may be removed if the residents cease to use her services.) In some embodiments, the user information can also indicate which users should have (or should not have) access to particular accessories At block 804, coordinator 510 can read accessory information form the home data to establish a list of all accessories that are considered part of the automated environment.

At block 806, coordinator 510 can select an accessory to audit (e.g., any accessory on the list established at block 804). At block 808, coordinator 510 can connect to the selected accessory and obtain a list of established pairings from the selected accessory. For instance, as described in above-referenced U.S. patent application Ser. No. 14/614,914, the uniform accessory protocol may provide a pairing service for an accessory, via which a controller with protocol admin privilege can request the list of established pairings from the accessory. At block 810, coordinator 510 can compare the list of pairings obtained at block 808 to the user information from the home data, and reconcile the list of pairings with expected pairings indicted by the home data. For instance, at block 812, coordinator 510 can determine whether an unexpected pairing is present, e.g., whether the list of established pairings obtained from the accessory includes a user who, according to the home data, should not have access. If an unexpected pairing is present, then at block 814, coordinator 510 can remove the unexpected pairing (e.g., using a pair remove process as described in above-referenced U.S. patent application Ser. No. 14/614, 914). At block 816, coordinator 510 can determine whether an expected pairing is missing, e.g., whether a user who should be granted access according to the home data does not have an established paring according to the list obtained from the accessory. If an expected pairing is missing, then at block 818, coordinator 510 can add the missing pairing (e.g., using a pair add process as described above). In some embodiments, the list of pairings received from the accessory can include an indicator of a privilege level associated with each pairing (e.g., protocol admin or protocol user privilege). At block 820, coordinator 510 can determine whether the privileges for each user are correct according to the user permissions assigned in the home data. If any discrepancies are found, then at block 822, coordinator 510 can correct the discrepancies, e.g., by instructing the accessory to grant or remove privileges from any pairings where the privilege is incorrect.

At block 824, coordinator 510 can determine whether more accessories should be audited. If so, coordinator 510 can return to block 806 to select another accessory to audit. If no more accessories are to be audited, process 800 can end at block 826.

Process 800 is illustrative and variations and modifications are possible. In some embodiments, process 800 can be performed periodically (e.g., monthly) by the designated coordinator for the automated environment. A data object representing the accessory in the environment model can include audit history information, e.g., indicating the date of the most recent audit. The coordinator can update the audit history whenever an accessory is audited, and the audit history can be used to determine when to conduct the next audit. While not required, periodic auditing can provide added protection against unauthorized access and/or inadvertent "lockout" events where a user who should be able to control an accessory cannot do so due to a missing pairing.

Example Process for Adding Users

Figure 9:
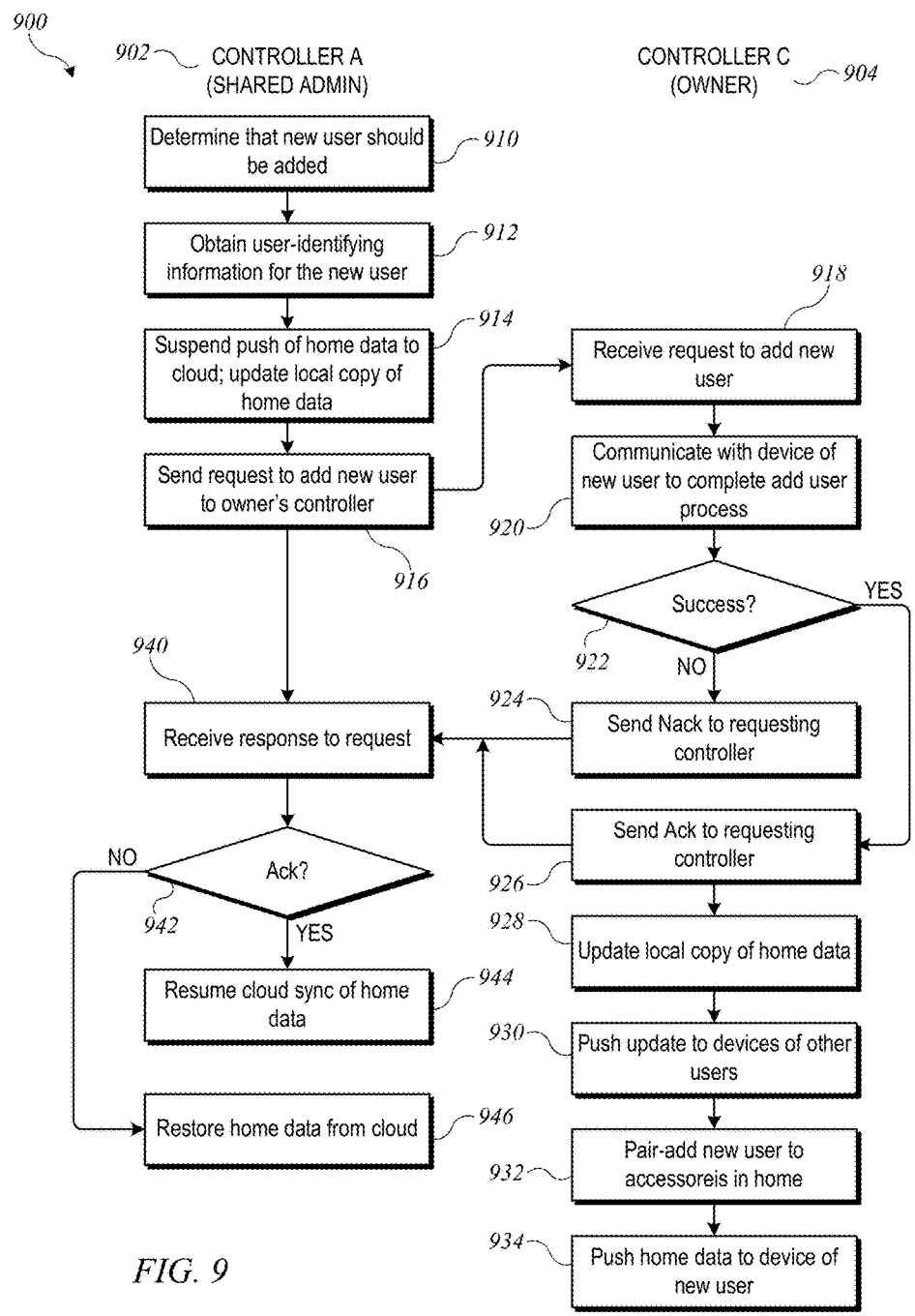
FIG. 9 shows a flow diagram of a process for inviting a user according to an embodiment of the present invention.

Another example of an update to the environment model that may involve additional action by the coordinator is adding a user. FIG. 9 shows a flow diagram of a process 900 for inviting a user according to an embodiment of the present invention. Portions of process 900 can be implemented in a first controller ("controller A") 902, and other portions of process 900 can be implemented in a second controller ("controller C") 904. Controller A 902 can be any controller that has admin permission for the environment model (e.g., any of Mom's devices 410, 412), and Controller C 904 can be the designated coordinator 510 for the environment model (which can be, e.g., set-top box 408) or another controller that belongs to a user with owner permission.

At block 910, controller A 902 can determine that a new user should be added to the environment model. For instance, a user operating controller A 902 can operate a user interface to indicate a desire to add a user. At block 912, controller A 902 can obtain user-identifying information for the new user, such as a user name that will be recognized by users of the environment, a user ID (e.g., the unique user identifier for the new user's account at the cloud-based data service), a permission level for the new user (which can be, e.g., any permission level lower than or equal to the permission level of the user of controller A), and any other information that may be useful in establishing the new user, such as an address or phone number usable to send messages to a controller device of the new user. At block 914, controller A 902 can suspend pushing of its home data to the cloud (similarly to block 612 of process 600) and update its local copy of the home data (similarly to block 614). Because pushing to the cloud is suspended, this update does not propagate to any other copy of the home data (and is not yet visible to any other controller or user, including the new user); however, updating the local copy allows the user of controller A 902 to begin interacting with the updated environment model without delay. At block 916, controller A 902 can send a request to add the new user to controller C 904. The request can include the user-identifying information that was obtained at block 912.

At block 918, controller C 902 can receive the request to add the new user. In some embodiments, prior to taking any other action, controller C 902 can confirm that the request originated from a user who has permission to add users to the environment model (e.g., a user with owner or admin permissions in the example of FIG. 3); if not, the request can be rejected at block 924.

At block 920, controller C 902 can communicate with a controller device that belongs to the new user to complete an add user process. Information provided in the request received at block 918 can be used to locate and communicate with the controller device of the new user. In some embodiments, the communication can include requesting and receiving a long-term public key for the new user that will be provided to accessories in the environment model (controller-specific keys can also be used) and providing the new user's controller with the encryption key that is used to encrypt the home data bundle. Authentication of the new user and a user interaction with the new user to confirm that the new user wants to be added to the environment model can also be incorporated; the particular process for adding a user can be modified as desired.

At block 922, controller C 904 can determine whether the add user process completed successfully. If not (or if controller A 902 was not authorized to make the request), then at block 924, controller C 904 can send a Nack response to controller A 902 to indicate that the request is rejected. If, on the other hand, controller C 904 determines that the process completed successfully, then at block 926, controller C 904 can send an Ack response to controller A 902 to indicate that the request is accepted. In addition, controller C 904 can incorporate the update into the environment model for all controllers. For example, similarly to blocks 626 and 628 of process 600, at block 928, controller C 904 can update its local copy of the home data (environment model); this update can propagate via cloud sync to all other controllers belonging to the same user as controller C 004. At block 930, controller C 904 can push the update to one device of each other user of the environment model.

Further, to complete the addition of the new user, at block 932, controller C 904 can perform a pair add operation with each accessory in the environment model to add a pairing using the long-term public key of the new user. This can enable the new user to operate the accessories. In some embodiments, the pair add operations can happen in parallel with pushing the update to other devices at block 930. At block 934, controller C 904 can push a copy of its local home data to the controller device of the new user (e.g., the same controller device that was used for the add user process at block 920). At this point, the new user can operate his or her controller to view information about the environment and interact with the accessories. If the new user has multiple controller devices, the controller device that receives the home data at block 934 can initiate a cloud sync operation to propagate a home data bundle to the new user's other controllers. In some embodiments, the operations at blocks 932 and 934 may be performed prior to the operations at blocks 928 and 930.

In the meantime, at block 940, coordinator C 902 can receive the response (either Ack or Nack) to the request from controller C 904. At block 942, controller A 902 can determine whether the response is positive (Ack) or negative (Nack). In the event of a positive acknowledgement, at block 942, controller A 902 can resume cloud sync of its home data. As with block 632 of process 600, this can result in the updated local copy (from block 916) being synched via the cloud to other controller devices belonging to the user of controller A 902. In the event of a negative acknowledgement, at block 946, controller A can restore its home data from cloud-based data service 430, similarly to block 636 of process 600. In some embodiments, controller A 902 can notify its user that the request to add a new user was rejected, and the user of controller A 902 may or may not be offered the option to retry. Whether an option to retry is offered may depend on the reason for rejecting the change, which can be communicated by controller C 904 in the Nack response.

Process 900 is illustrative and variations and modifications are possible. Process 900 can be used for adding a new user by any controller that has permission to add users to the environment model (e.g., any controller belonging to a user the model identifies as having permission to add users). For example, a coordinator for the environment may operate as controller C, and any other controller that receives input related to adding an accessory can operate as controller A. Thus, in some instances, controller C and controller A can be two different devices belonging to the owner of the environment model.

The process of adding a user to each accessory in the home may take a significant amount of time, depending on the number of accessories and the rate at which controller C can perform pair add processes. In some embodiments, the new user does not receive a copy of the environment model (home data) until at least one of the accessories in the environment has a pairing with the new user (e.g., via pair add). In some embodiments, the new user may receive a copy of the environment model before pair add has been performed with all accessories. In this case, the new user may be able to see all of the accessories (e.g., represented in a user interface presented by the new user's controller device) but not control all of them, and the user interface may include a status message indicating that the user is still in the process of being added and that more accessories will be available shortly.

Removing a user can be managed using a process similar to process 900, except that instead of performing pair add with each accessory, controller C can perform a pair remove operation so that the removed user's controllers are no longer able to control the accessories. In some embodiments, any user may be able to request his or her own removal, regardless of permission; the ability to request removal of another user can be restricted, e.g., to users with admin or owner permissions.

Example Editing Mode

In the examples described above, it is assumed that controller A performs one update at a time, sending a request to controller C and receiving a response before proceeding with any further updates. In some embodiments, it may be desirable for the user of controller A to be able to make multiple update requests without having to wait for a response to each request. Accordingly, some embodiments of the present invention can support an "editing mode," in which the user of controller A can make any number of changes to the environment model (home data) while cloud sync of the home data is suspended. When all the desired changes have been processed by controller C, controller A can make a final determination to commit the changes (e.g., by resuming cloud sync) or to revert to a previous state of the home data (e.g., by retrieving the home data bundle from the cloud-based data service).

Figure 10:
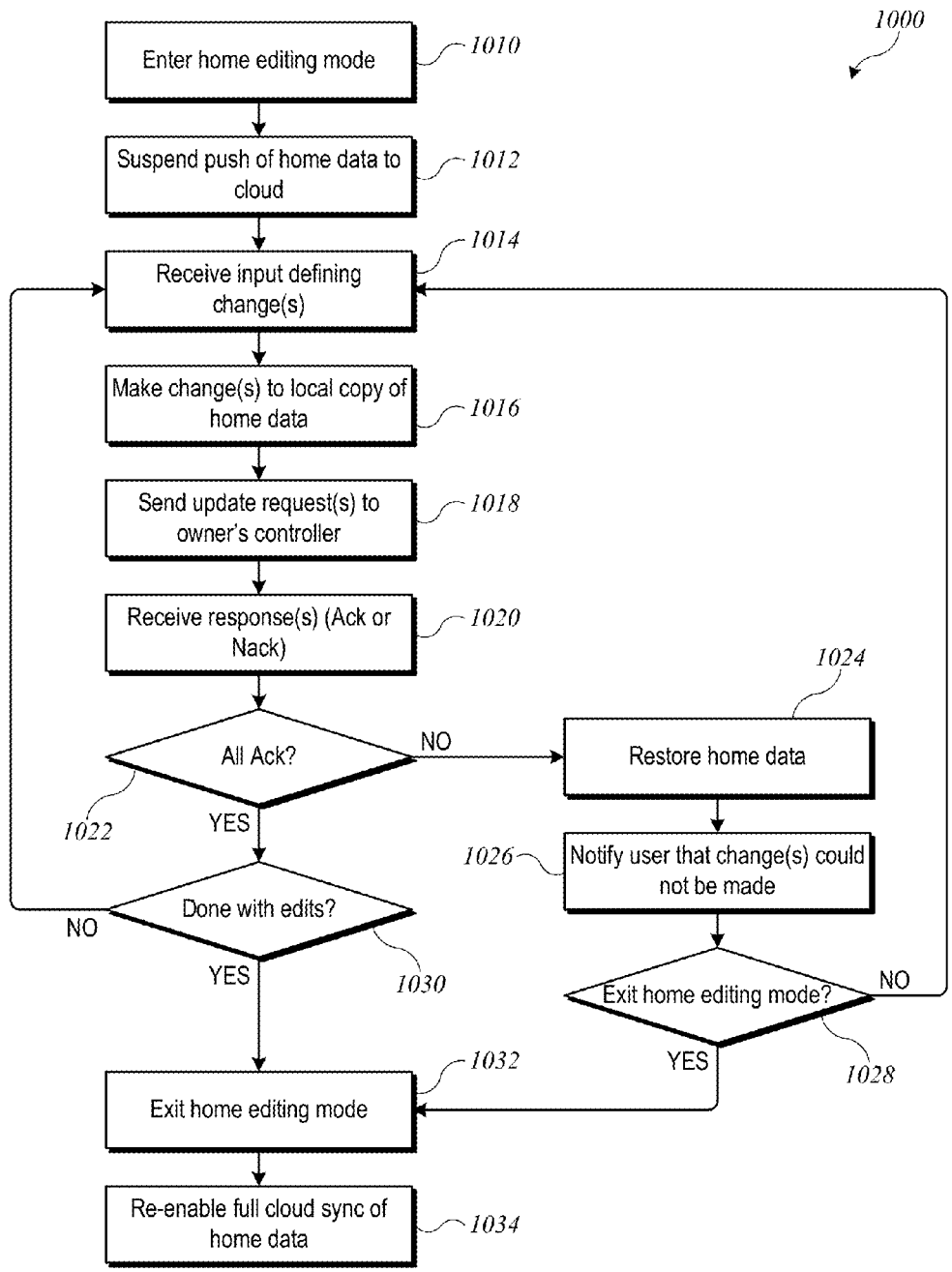
FIG. 10 shows a flow diagram of a process for an editing mode according to an embodiment of the present invention.

FIG. 10 shows a flow diagram of a process 1000 for an editing mode according to an embodiment of the present invention. Process 1000 can be implemented in any controller that can operate as "controller A" in any of processes 600, 700, or 900 described above. Controller A can communicate with another controller (e.g., any controller that can operate as "controller C" in any of processes 600, 700, or 900 described above).

At block 1010, controller A can enter a "home editing" mode. For example, controller A can present a graphical user interface for interacting with the automated environment, and the graphical user interface can include a user-operable control element to indicate a desire to edit or configure the environment. Controller A can enter the home editing mode in response to user operation of this control element. Entering the home editing mode can include presenting a graphical user interface adapted for making changes to the environment (which may be different from an interface adapted to controlling accessories in the environment). At block 1012, entering the editing mode can also include controller A suspending pushing of its home data to the cloud, similarly to block 612 of process 600 described above.

At block 1014, controller A can receive user input defining one or more changes to be made to the environment model. As the input is received, at block 1016, controller A can make corresponding changes to its local copy of the home data (which are not propagated to other controllers as long as cloud sync is suspended), and at block 1018, controller A can send one or more update requests to controller C (which can be, e.g., coordinator 510 as described above). The request(s) at block 1018 can be similar to the request at block 616 of process 600; in some embodiments, a "batch" request message format can be supported, in which multiple requested updates are transmitted in a single request message. At block 1020, controller A can receive response(s) to the update requests. In some embodiments, each request receives an Ack or Nack response (as in process 600); a "batch" response message format can be supported, in which multiple responses are transmitted in a single response message. The responses can be determined by controller C in the manner described above, and in the event of an Ack response, controller C can propagate the update to the controller devices of other users in the manner described above.

At block 1022, if at least one response is a Nack, then controller A can roll back to the last known good version of the home data. Accordingly, at block 1024, controller A can restore its local copy of the home data, similarly to block 636 of process 600. In some embodiments, restoring the local copy of the home data can include overwriting the local copy with the content of the corresponding home data bundle from cloud-based data service 430. This has the effect of undoing all of the changes that were made since entering the editing mode at block 1010. In some embodiments, controller A can restore its local copy by requesting that controller C push a copy of the home data to controller A. In the case where controller A accepted some but not all of the requested changes, this can reliably provide controller A with the most current version of the home data. Where controller A restores its local copy of the home data from controller C, controller A can also push the restored copy to the cloud for future synchronization, or wait until the user decides to exit home editing mode.

At block 1026, controller A can notify its user that the change(s) could not be made. At block 1028, the user can indicate a choice to exit home editing mode, in which case process 1000 can proceed to block 1032 (described below) or remain in home editing mode and try again, in which case process 1000 can return to block 1014 to receive further input. In some embodiments, the notification at block 1026 can include information about which change(s) could not be made and the reason for the failure to make the change(s); this can inform the user's decision at block 1028.

If, at block 1022, all responses are Ack, then at block 1030, controller A can determine whether the user is done with edits. For instance, the user interface for the editing mode can include a user-operable control element to indicate that the user has finished making changes. If the user is not finished, process 1000 can return to block 1014 to continue editing operations. Editing operations can continue indefinitely.

If block 1030 results in a determination that the user is done with edits, then at block 1032, controller A can exit the home editing mode (which can include, e.g., returning the user interface to a mode adapted for controlling accessories), and at block 1034, controller A can re-enable cloud sync of its home data (in particular, re-enabling pushing of data to the cloud, which was suspended at block 1012), similarly to block 634 of process 600. If changes were made and accepted while in editing mode, these changes will be propagated to the cloud and from there to the user's other controllers.

Process 1000 is illustrative, and variations and modifications are possible. For example, although blocks 1014-1022 are shown and described sequentially, it is possible to have multiple update requests in flight simultaneously. Accordingly, after sending an update request at block 1018, controller A can continue to receive and process input (block 1014) without waiting for a response to the update request. In some embodiments, controller C can send responses in the order requests were received; in other embodiments, out-of-order responses can be supported. For example, controller A can assign a request identifier to each update request it sends, and the response from controller C can include the request identifier, allowing controller A to match responses to requests.

Process 1000 can be implemented in any controller (referred to as "controller A") that is authorized to modify (or update) a shared environment model, and the controller implementing process 100 can communicate with another controller (referred to as "controller C") that has been designated to coordinate the modifications (or updates). Having a designated coordinator for modifications can facilitate resolution of conflicting updates and help maintain the consistency of the environment model across all controllers that have access to it.

Example Devices

Embodiments described herein can be implemented in electronic devices that can be of generally conventional design. Such devices can be adapted to conform to a uniform accessory protocol that supports command-and-control operations by which a controller (a first electronic device) can control operation of an accessory (a second electronic device). In some instances, a device can combine features or aspects of a controller and an accessory, e.g., in the case of a coordinator or proxy as described above.

Figure 11:
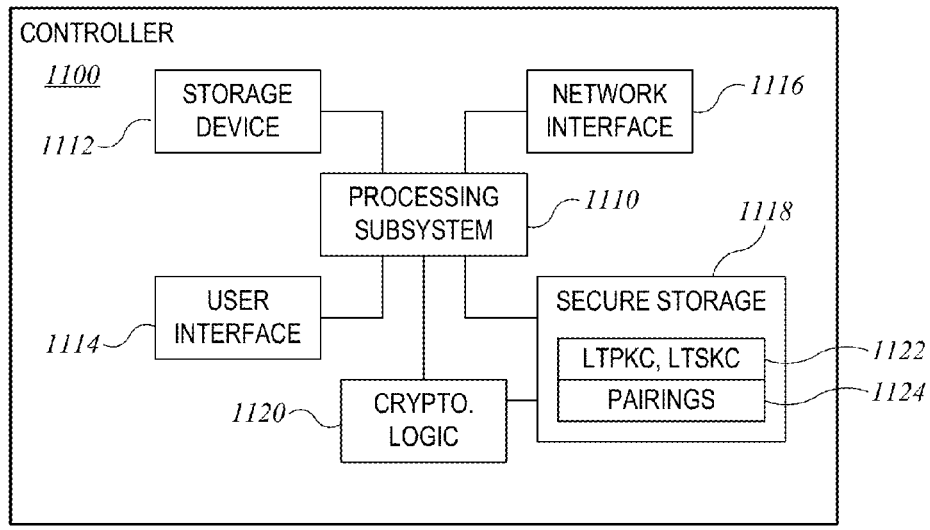
FIG. 11 shows a simplified block diagram of a controller according to an embodiment of the present invention.

FIG. 11 shows a simplified block diagram of a controller 1100 according to an embodiment of the present invention. Controller 1100 can implement any or all of the controller functions, behaviors, and capabilities described herein, as well as other functions, behaviors, and capabilities not expressly described. Controller 1100 can include processing subsystem 1110, storage device 1112, user interface 1114, communication interface 1116, secure storage module 1118, and cryptographic logic module 1120. Controller 1100 can also include other components (not explicitly shown) such as a battery, power controllers, and other components operable to provide various enhanced capabilities. In various embodiments, controller 1100 can be implemented in a desktop computer, laptop computer, tablet computer, smart phone, other mobile phone, wearable computing device, or other systems having any desired form factor. Further, as noted above, controller 1100 can be implemented partly in a base station and partly in a mobile unit that communicates with the base station and provides a user interface.

Storage device 1112 can be implemented, e.g., using disk, flash memory, or any other non-transitory storage medium, or a combination of media, and can include volatile and/or non-volatile media. In some embodiments, storage device 1112 can store one or more application and/or operating system programs to be executed by processing subsystem 1110, including programs to implement various operations described above as being performed by a controller. For example, storage device 1112 can store a uniform controller application that can read an accessory description record and generate a graphical user interface for controlling the accessory based on information therein (e.g., as described in above-referenced U.S. application Ser. No. 14/614,914). In some embodiments, portions (or all) of the controller functionality described herein can be implemented in operating system programs rather than applications. In some embodiments, storage device 1112 can also store apps designed for specific accessories or specific categories of accessories (e.g., an IP camera app to manage an IP camera accessory or a security app to interact with door lock accessories). Storage device 1112 can also store other data produced or used by controller 1100 in the course of its operations, including trigger data objects and/or other data pertaining to an environment model.

User interface 1114 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1114 to invoke the functionality of controller 1100 and can view and/or hear output from controller 1100 via output devices of user interface 1114.

Processing subsystem 1110 can be implemented as one or more integrated circuits, e.g., one or more single-core or multi-core microprocessors or microcontrollers, examples of which are known in the art. In operation, processing system 1110 can control the operation of controller 1100. In various embodiments, processing subsystem 1110 can execute a variety of programs in response to program code and can maintain multiple concurrently executing programs or processes. At any given time, some or all of the program code to be executed can be resident in processing subsystem 1110 and/or in storage media such as storage device 1112.

Through suitable programming, processing subsystem 1110 can provide various functionality for controller 1100. For example, in some embodiments, processing subsystem 1110 can implement various processes (or portions thereof) described above as being implemented by a controller. Processing subsystem 1110 can also execute other programs to control other functions of controller 1100, including application programs that may be stored in storage device 1112. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Communication interface 1116 can provide voice and/or data communication capability for controller 1100. In some embodiments communication interface 1116 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1116 can provide wired network connectivity (e.g., Ethernet) in addition to or instead of a wireless interface. Communication interface 1116 can be implemented using a combination of hardware (e.g., driver circuits, antennas, modulators/demodulators, encoders/decoders, and other analog and/or digital signal processing circuits) and software components. In some embodiments, communication interface 1116 can support multiple communication channels concurrently or at different times, using the same transport or different transports.

Secure storage module 1118 can be an integrated circuit or the like that can securely store cryptographic information for controller 1100. Examples of information that can be stored within secure storage module 1118 include the controller's long-term public and secret keys 1122 (LTPKC, LTSKC as described above), and a list of paired accessories 1124 (e.g., a lookup table that maps accessory ID to accessory long-term public key LTPKA for accessories that have completed a pair setup or pair add process as described above).

In some embodiments, cryptographic operations can be implemented in a cryptographic logic module 1120 that communicates with secure storage module 1118. Physically, cryptographic logic module 1120 can be implemented in the same integrated circuit with secure storage module 1118 or a different integrated circuit (e.g., a processor in processing subsystem 1110) as desired. Cryptographic logic module 1120 can include various logic circuits (fixed or programmable as desired) that implement or support cryptographic operations of controller 1100, including any or all cryptographic operations described above. Secure storage module 1118 and/or cryptographic logic module 1120 can appear as a "black box" to the rest of controller 1100. Thus, for instance, communication interface 1116 can receive a message in encrypted form that it cannot decrypt and can simply deliver the message to processing subsystem 1110. Processing subsystem 1110 may also be unable to decrypt the message, but it can recognize the message as encrypted and deliver it to cryptographic logic module 1120. Cryptographic logic module 1120 can decrypt the message (e.g., using information extracted from secure storage module 1118) and determine what information to return to processing subsystem 1110. As a result, certain information can be available only within secure storage module 1118 and cryptographic logic module 1120. If secure storage module 1118 and cryptographic logic module 1120 are implemented on a single integrated circuit that executes code only from an internal secure repository, this can make extraction of the information extremely difficult, which can provide a high degree of security. Other implementations are also possible.

Figure 12:
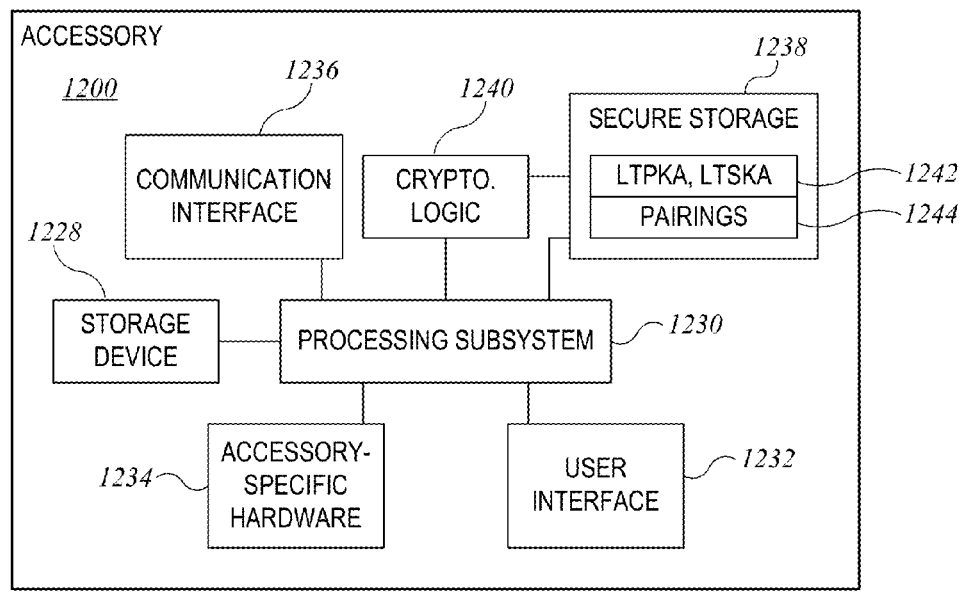
FIG. 12 shows a simplified block diagram of an accessory according to an embodiment of the present invention.

FIG. 12 shows a simplified block diagram of an accessory 1200 according to an embodiment of the present invention. Accessory 1200 can implement any or all of the accessory functions, behaviors, and capabilities described herein, as well as other functions, behaviors, and capabilities not expressly described. Accessory 1200 can include storage device 1228, processing subsystem 1230, user interface 1232, accessory-specific hardware 1234, communication interface 1236, secure storage module 1238, and cryptographic logic module 1240. Accessory 1200 can also include other components (not explicitly shown) such as a battery, power controllers, and other components operable to provide various enhanced capabilities.

Accessory 1200 is representative of a broad class of accessories that can be operated by a controller such as controller 1100, and such accessories can vary widely in capability, complexity, and form factor. Various accessories may include components not explicitly shown in FIG. 12, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1228 can be implemented, e.g., using disk, flash memory, or any other non-transitory storage medium, or a combination of media, and can include volatile and/or non-volatile media. In some embodiments, storage device 1228 can store one or more programs (e.g., firmware) to be executed by processing subsystem 1230, including programs to implement various operations described above as being performed by an accessory, as well as operations related to particular accessory behaviors. Storage device 1228 can also store an accessory object or accessory definition record that can be furnished to controller devices, e.g., during device discovery as described in above-referenced U.S. application Ser. No. 14/614,914. Storage device 1228 can also store accessory state information and any other data that may be used during operation of accessory 1200.

Processing subsystem 1230 can include, e.g., one or more single-core or multi-core microprocessors and/or microcontrollers executing program code to perform various functions associated with accessory 1200. For example, processing subsystem 1230 can implement various processes (or portions thereof) described above as being implemented by an accessory, e.g., by executing program code stored in storage device 1228. Processing subsystem 1230 can also execute other programs to control other functions of accessory 1230. In some instances programs executed by processing subsystem 1230 can interact with a controller (e.g., controller 1100), e.g., by generating messages to be sent to the controller and/or receiving messages from the controller.

User interface 1232 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 1200, a user can operate input devices of user interface 1232 to invoke functionality of accessory 1200 and can view and/or hear output from accessory 1200 via output devices of user interface 1232. Some accessories may provide a minimal user interface or no user interface. at all. Where the accessory does not have a user interface, a user can still interact with the accessory using a controller (e.g., controller 1100).

Accessory-specific hardware 1234 can include any other components that may be present in accessory 1200 to enable its functionality. For example, in various embodiments accessory-specific hardware 1234 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 1234 and that accessory-specific hardware can include mechanical as well as electrical or electronic components.

Communication interface 1236 can provide voice and/or data communication capability for accessory 1200. In some embodiments communication interface 1236 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1236 can provide wired network connectivity (e.g., Ethernet) in addition to or instead of a wireless interface. Communication interface 1236 can be implemented using a combination of hardware (e.g., driver circuits, antennas, modulators/demodulators, encoders/decoders, and other analog and/or digital signal processing circuits) and software components. In some embodiments, communication interface 1236 can support multiple communication channels concurrently or at different times, using the same transport or different transports.

Secure storage module 1238 can be an integrated circuit or the like that can securely store cryptographic information for accessory 1200. Examples of information that can be stored within secure storage module 1238 include the accessory's long-term public and secret keys 1242 (LTPKA, LTSKA as described above), and a list of paired controllers 1244 (e.g., a lookup table that maps controller ID to controller long-term public key LTPKC for controllers that have completed a pair setup or pair add process as described above). In some embodiments, secure storage module 1238 can be omitted; keys and lists of paired controllers can be stored in storage device 1228.

In some embodiments, cryptographic operations can be implemented in a cryptographic logic module 1240 that communicates with secure storage module 1238. Physically, cryptographic logic module 1240 can be implemented in the same integrated circuit with secure storage module 1238 or a different integrated circuit (e.g., a processor in processing subsystem 1230) as desired. Cryptographic logic module 1240 can include various logic circuits (fixed or programmable as desired) that implement or support cryptographic operations of accessory 1200, including any or all cryptographic operations described above. Secure storage module 1238 and/or cryptographic logic module 1240 can appear as a "black box" to the rest of accessory 1200. Thus, for instance, communication interface 1236 can receive a message in encrypted form that it cannot decrypt and can simply deliver the message to processing subsystem 1230. Processing subsystem 1230 may also be unable to decrypt the message, but it can recognize the message as encrypted and deliver it to cryptographic logic module 1240. Cryptographic logic module 1240 can decrypt the message (e.g., using information extracted from secure storage module 1238) and determine what information to return to processing subsystem 1230. As a result, certain information can be available only within secure storage module 1238 and cryptographic logic module 1240. If secure storage module 1238 and cryptographic logic module 1240 are implemented on a single integrated circuit that executes code only from an internal secure repository, this can make extraction of the information extremely difficult, which can provide a high degree of security. Other implementations are also possible.

Accessory 1200 can be any electronic apparatus that interacts with controller 1100. In some embodiments, controller 1100 can provide remote control over operations of accessory 1200 as described above. For example controller 1100 can provide a remote user interface for accessory 1200 that can include both input and output controls (e.g., a display screen to display current status information obtained from accessory 1200 and an input control such as a touchscreen overlay to allow changes to the status information). Controller 1100 in various embodiments can control any function of accessory 1200 and can also receive data from accessory 1200.

It will be appreciated that the system configurations and components described herein are illustrative and that variations and modifications are possible. It is to be understood that an implementation of controller 1100 can perform all operations described above as being performed by a controller and that an implementation of accessory 1200 can perform any or all operations described above as being performed by an accessory. A proxy, bridge, tunnel, or coordinator can combine components of controller 1100 and accessory 1200, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Further Embodiments

While the invention has been described with respect to specific embodiments, one skilled in the art will recognize that numerous modifications are possible.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method, comprising:
   receiving, at a first controller device, an input requesting a change to home data descriptive of an automated environment that comprises one or more accessories controllable by the first controller device, wherein a local copy of the home data is stored at the first controller device and synchronized by the first controller device with a master copy of the home data that is stored at a cloud-based data management service;
   suspending, by the first controller device, pushing of the local copy of the home data to the cloud-based data management service in response to the input;
   updating, by the first controller device, the local copy of the home data in response to the input;
   sending, by the first controller device, an update request to a second controller device, the second controller device being associated with an owner of the home data, the update request comprising a request to apply the update to the master copy of the home data;
   receiving, by the first controller device, a response to the request from the second controller device, the response comprising either a positive acknowledgment indicating that the update request is accepted and that the master copy of the home data is to be updated or a negative acknowledgement indicating that the update request is rejected;
   in the event that the response comprises the positive acknowledgement, synchronizing the local copy of the home data with the master copy; and
   in the event that the response comprises the negative acknowledgement, replacing the local copy of the home data with the master copy.

2. The method of claim 1, wherein the second controller belongs to a first user who is designated in the master copy of the home data as an owner of the automated environment and the second controller belongs to a second user who is designated in the master copy of the home data as an administrator of the automated environment, wherein the owner of the automated environment can change the administrator designation in the master copy of the home data but the administrator of the automated environment cannot change the owner designation in the master copy of the home data.

3. The method of claim 1, wherein the second controller is identified in the master copy of the home data as a coordinator for the automated environment.

4. The method of claim 1, wherein the first controller and the second controller both belong to a first user who is designated in the master copy of the home data as an owner of the automated environment.

5. The method of claim 4, wherein the second controller is also configured to receive update requests from a third controller and wherein the response to the request from the first controller depends at least in part on whether a conflicting update was received from the third controller.

6. The method of claim 1, wherein replacing the local copy of the home data with the master copy comprises retrieving the master copy from the cloud-based data management service.

7. A non-transitory computer-readable storage medium having stored therein program code that, when executed by one or more processors in a first controller device, cause the first controller device to perform operations comprising:
   entering a home editing mode that permits changing home data descriptive of an automated environment that comprises one or more accessories controllable by the first controller device, wherein a local copy of the home data is stored at the first controller device and synchronized by the first controller device with a master copy of the home data that is stored at a cloud-based data management service;
   suspending pushing of the local copy of the home data to the cloud-based data management service in response to entering the home editing mode;
   receiving one or more inputs indicating one or more updates to be made to the home data;
   updating the local copy of the home data in response to the one or more inputs;
   sending one or more update requests to a second controller device, the second controller device being associated with an owner of the home data, each of the one or more update requests comprising a request to apply a different one of the one or more updates to the master copy of the home data;
   receiving a response from the second controller device to each of the one or more update requests, each response comprising either a positive acknowledgment indicating that the update request is accepted and that the master copy of the home data is to be updated or a negative acknowledgement indicating that the update request is rejected; and
   exiting the editing mode, wherein exiting the editing mode comprises:
      in the event that all of the responses comprise the positive acknowledgement, synchronizing the local copy of the home data with the master copy; and
      in the event that one or more of the responses comprises the negative acknowledgement, replacing the local copy of the home data with the master copy.

8. The non-transitory computer-readable storage medium of claim 7, wherein the second controller belongs to a first user who is designated in the master copy of the home data as an owner of the automated environment and the second controller belongs to a second user who is designated in the master copy of the home data as an administrator of the automated environment, wherein the owner of the automated environment can change the administrator designation in the master copy of the automated environment data but the administrator of the home cannot change the owner designation in the master copy of the home data.

9. The non-transitory computer-readable storage medium of claim 7, wherein the second controller is identified in the master copy of the home data as a coordinator for the automated environment.

10. The non-transitory computer-readable storage medium of claim 7, wherein replacing the local copy of the home data with the master copy comprises retrieving the master copy from the cloud-based data management service.

11. A first controller device, comprising:
   a communication interface;
   at least one memory configured to store computer-executable instructions; and
   one or more processors coupled to the communication interface and the at least one memory, the one or more processors configured to execute the computer-executable instructions to:

receive an input requesting a change to home data descriptive of an automated environment that comprises one or more accessories controllable by the first controller device, wherein a local copy of the home data is stored at the first controller device and synchronized by the first controller device with a master copy of the home data that is stored at a cloud-based data management service;

suspend pushing of the local copy of the home data to the cloud-based data management service in response to the input;

update the local copy of the home data in response to the input;

send an update request to a second controller device, the second controller device being associated with an owner of the home data, the update request comprising a request to apply the update to the master copy of the home data;

receive a response to the request from the second controller device, the response comprising either a positive acknowledgment indicating that the update request is accepted and that the master copy of the home data is to be updated or a negative acknowledgement indicating that the update request is rejected;

in the event that the response comprises the positive acknowledgement, synchronize the local copy of the home data with the master copy; and in the event that the response comprises the negative acknowledgement, replace the local copy of the home data with the master copy.

12. The first controller device of claim 11, wherein the second controller belongs to a first user who is designated in the master copy of the home data as an owner of the automated environment and the second controller belongs to a second user who is designated in the master copy of the home data as an administrator of the automated environment, wherein the owner of the automated environment can change the administrator designation in the master copy of the home data but the administrator of the automated environment cannot change the owner designation in the master copy of the home data.

13. The first controller device of claim 11, wherein the second controller is identified in the master copy of the home data as a coordinator for the automated environment.

14. The first controller device of claim 11, wherein the first controller and the second controller both belong to a first user who is designated in the master copy of the home data as an owner of the automated environment.

15. The first controller device of claim 14, wherein the second controller is also configured to receive update requests from a third controller and wherein the response to the request from the first controller depends at least in part on whether a conflicting update was received from the third controller.

16. The first controller device of claim 11, wherein replacing the local copy of the home data with the master copy comprises retrieving the master copy from the cloud-based data management service.

* * * * *